United States Patent [19]

Arita et al.

[11] Patent Number: 5,095,418

[45] Date of Patent: * Mar. 10, 1992

[54] MULTIPLEX CONTROL SYSTEM

[75] Inventors: Setsuo Arita, Hitachiota; Tetsuo Ito, Hitachi; Satoshi Suzuki, Mito; Atomi Noguchi, Hitachi, all of Japan

[73] Assignee: Hitachi, Ltd., Tokyo, Japan

[*] Notice: The portion of the term of this patent subsequent to Jan. 29, 2008 has been disclaimed.

[21] Appl. No.: 643,205

[22] Filed: Jan. 18, 1991

Related U.S. Application Data

[63] Continuation of Ser. No. 242,170, Sep. 9, 1988, Pat. No. 4,989,129.

[30] Foreign Application Priority Data

Sep. 11, 1987 [JP] Japan ................................ 62-226370

[51] Int. Cl.⁵ .............................................. G05B 9/03
[52] U.S. Cl. .................................... 364/187; 376/215; 371/24
[58] Field of Search ................................ 364/184–187; 376/215, 216, 245, 259; 371/15, 15.4, 25.1, 24

[56] References Cited

U.S. PATENT DOCUMENTS

| 3,639,778 | 2/1972 | Cereghino et al. | 307/204 |
| 4,517,154 | 5/1985 | Dennis et al. | 376/259 |
| 4,989,129 | 1/1991 | Arita et al. | 364/187 |

FOREIGN PATENT DOCUMENTS

| 0109602 | 5/1984 | European Pat. Off. |
| 0220900 | 1/1989 | European Pat. Off. |
| 1419673 | 12/1975 | United Kingdom |

Primary Examiner—Jerry Smith
Assistant Examiner—Paul Gordon
Attorney, Agent, or Firm—Antonelli, Terry, Stout & Kraus

[57] ABSTRACT

A multiplex control system has a plurality of control apparatuses, test signal generators provided, respectively, for the control apparatuses for the purpose of internal diagnosis thereof, signal selectors each for selecting a signal to operate a device under control from the signals produced by the control apparatuses, and diagnosis units each for deciding presence or absence of abnormality in the associated signal selector with the aid of the signals inputted to the signal selector and the output signal therefrom.

4 Claims, 23 Drawing Sheets

| No. | INPUTS TO MA-JORITY DECI-SION CIRCUIT | | | OUTPUTS OF LOGICAL ELEMENTS OF MAJORITY DECISION CIRCUIT | | | |
|---|---|---|---|---|---|---|---|
| | a | b | c | OUTPUT OF DETECTOR 12A | OUTPUT OF DETECTOR 12B | OUTPUT OF DETECTOR 12C | OUTPUT OF DETECTOR 18A |
| 1 | 0 | 0 | 0 | 0 | 0 | 0 | 0 |
| 2 | 0 | 0 | 1 | 0 | 1 | 1 | 0 |
| 3 | 0 | 1 | 0 | 1 | 1 | 0 | 0 |
| 4 | 0 | 1 | 1 | 1 | 1 | 1 | 1 |
| 5 | 1 | 0 | 0 | 1 | 0 | 1 | 0 |
| 6 | 1 | 0 | 1 | 1 | 1 | 1 | 1 |
| 7 | 1 | 1 | 0 | 1 | 1 | 1 | 1 |
| 8 | 1 | 1 | 1 | 1 | 1 | 1 | 1 |

| SIGNAL DETECTORS | DETECTION SIGNALS | DETECTABLE RELAYS |
|---|---|---|
| SIGNAL DETECTORS 86A | a | 85A |
| SIGNAL DETECTORS 86B | b | 85B |
| SIGNAL DETECTORS 86C | a·c | 85C, 85D |
| SIGNAL DETECTORS 86D | c | 85E |
| SIGNAL DETECTORS 86E | d | 85F |
| SIGNAL DETECTORS 86F | b·d | 85G, 85H |

FIG. 29

| SIGNALS 17A2 (OUTPUT OF DETECTORS 86A-86F) | | | | | | DETECTABLE RELAYS |
|---|---|---|---|---|---|---|
| DETECTOR 86A | DETECTOR 86B | DETECTOR 86C | DETECTOR 86D | DETECTOR 86E | DETECTOR 86F | |
| 1 | 1 | 1 | 1 | 1 | 1 | 85A~85H |
| 0 | 1 | 0 | 1 | 1 | 1 | 85A, 85C |
| 1 | 0 | 1 | 1 | 1 | 0 | 85B, 85G |
| 1 | 1 | 0 | 0 | 1 | 1 | 85D, 85E |
| 1 | 1 | 1 | 1 | 0 | 0 | 85F, 85H |
| 0 | 0 | 0 | 0 | 0 | 0 | 85A, 85C, 85F, 85H |
| 0 | 0 | 0 | 0 | 0 | 0 | 85A, 85C, 85D, 85E |
| 0 | 0 | 0 | 0 | 0 | 0 | 85A, 85C, 85G |
| 0 | 0 | 0 | 0 | 0 | 0 | 85B, 85F~85H |
| 0 | 0 | 0 | 0 | 0 | 0 | 85B, 85D, 85E, 85G |
| 0 | 0 | 0 | 0 | 0 | 0 | 85D~85F, 85H |
| 0 | 0 | 0 | 0 | 0 | 0 | 85C~85F, 85A, 85H |
| 0 | 0 | 0 | 0 | 0 | 0 | 85A~85C, 85F~85H |
| 0 | 0 | 0 | 0 | 0 | 0 | 85A~85E, 85G |
| 0 | 0 | 0 | 0 | 0 | 0 | 85B, 85D~85H |
| 0 | 0 | 0 | 0 | 0 | 0 | 85A~85H |

MULTIPLEX CONTROL SYSTEM

This application is a continuation of application Ser. No. 242,170, filed Sept. 9, 1988 now U.S. Pat. No. 4,989,129.

CROSS-REFERENCE TO RELATED APPLICATION

Reference is made to copending U.S. patent application Ser. No. 69,046 filed July 2, 1987 under the title "CONTROL SYSTEM" assigned to the assignee of the present application.

BACKGROUND OF THE INVENTION

The present invention generally relates to a multiplex control system and more particularly to the multiplex control system imparted with diagnosis function.

In general, the control system to which a great importance is put is implemented with redundancy by multiplexing the control in an effect to enhance the reliability of the control system as a whole. As a typical example of such control systems, there can be mentioned a nuclear reactor protecting system in a nuclear power plant in which control channels are provided in quadruple in order to ensure an extremely be made, for example, to U.S. Pat. No. 4,517,154 and EP-A-180085 which are both concerned with such type of nuclear reactor protecting system as mentioned above. More specifically, in the nuclear reactor protecting system disclosed in these literatures, control systems or channels are provided in quadruple, wherein control signals outputted from these four control channels are inputted to a majority decision circuit configured in the form of a 2-out-of-4 logic voting circuit so that a device subject to control such as, for example, a valve is actuated on the basis of the control signal selected by the majority decision circuit. In the case of the nuclear reactor protecting system disclosed in the abovementioned U.S. Patent, a diagnosis unit is provided for diagnosing the function of all the quadruplexed control channels. In more concrete, a single diagnosis unit produces test signals sequentially to the quadruplexed control channels for making decision as to the presence or absence of abnormality or malfunction in each of the control channels.

In the nuclear reactor protecting system of the structure mentioned above, occurrence of abnormality (malfunction) in the diagnosis unit itself might lead to such utterly undesirable situation in which all the quadruplexed control channels could simultaneously output erroneous test signals, resulting in that the device subject to the control might be inadvertently or erroneously operated. It is further noted that in this known nuclear reactor protecting system, the abnormality decision is not performed for the majority decision circuit, i.e. the signal selecting circuit itself.

SUMMARY OF THE INVENTION

It is therefore an object of the present invention to provide an improved multiplex control system in which even in the event that abnormality should occur in at least one of test signal generating means and a mechanism for applying the test signal for the diagnosis of abnormality as outputted from the test signal generating means to the signal selecting means, the possibility that a device to be controlled might be affected by such abnormality can be reduced to a possible minimum, while making it possible to diagnose the signal selecting means (majority decision circuit) with regard to the presence of abnormality.

With the above object in view, there is provided according to an aspect of the present invention a multiplex control system which comprises a plurality of test signal generating means provided, respectively, in correspondence with a plurality of control apparatuses (also referred to as controller) installed in parallel with one another for producing respective test signals for the diagnosis of abnormality, at least one signal selecting means for selecting from the signals produced by the plurality of control apparatuses a signal for operating a device to be controlled, and a plurality of diagnosis units for deciding the presence or absence of abnormality in the signal selecting means on the basis of the signals inputted to the signal selecting means and the signal outputted therefrom.

By virtue of such arrangement that the test signals for the diagnosis of abnormality as outputted from all the signal generating means provided in one-to-one correspondence with the plurality of control apparatuses are inputted to the signal selection means which is so designed to select the proper input signal from a number of the input signals, the device subject to the control (e.g. a valve being monitored) can be protected against the influence of an abnormal test signal, even when such abnormal test signal produced due to occurrence of abnormality in at least one of the test signal generating means and a mechanism for applying the outputted abnormality diagnosing test signal to the signal selecting means circuit should be applied to the signal selecting means. Further, since each of the diagnosis units provided in correspondence with the plurality of control apparatuses performs the diagnosis with regard to the abnormality of the signal selecting means with the aid of all the signals inputted to the signal selecting means and the output signals of individual logical elements constituting the signal selecting means, the abnormality diagnosis of the signal selecting means can be carried out in a facilitated manner.

BRIEF DESCRIPTION OF THE DRAWINGS

FIG. 29 is a view showing signal patterns indicative of normal state of the majority decision circuits in the system of FIG. 23;

DESCRIPTION OF THE PREFERRED EMBODIMENTS

Now, the present invention will be described in detail in conjunction with a preferred and exemplary of the multiplex control system imparted with a diagnosis function by reference to FIG. 1. The multiplex control system shown in this figure is implemented in the form of a triplex control system, by way of example.

Figure 1:
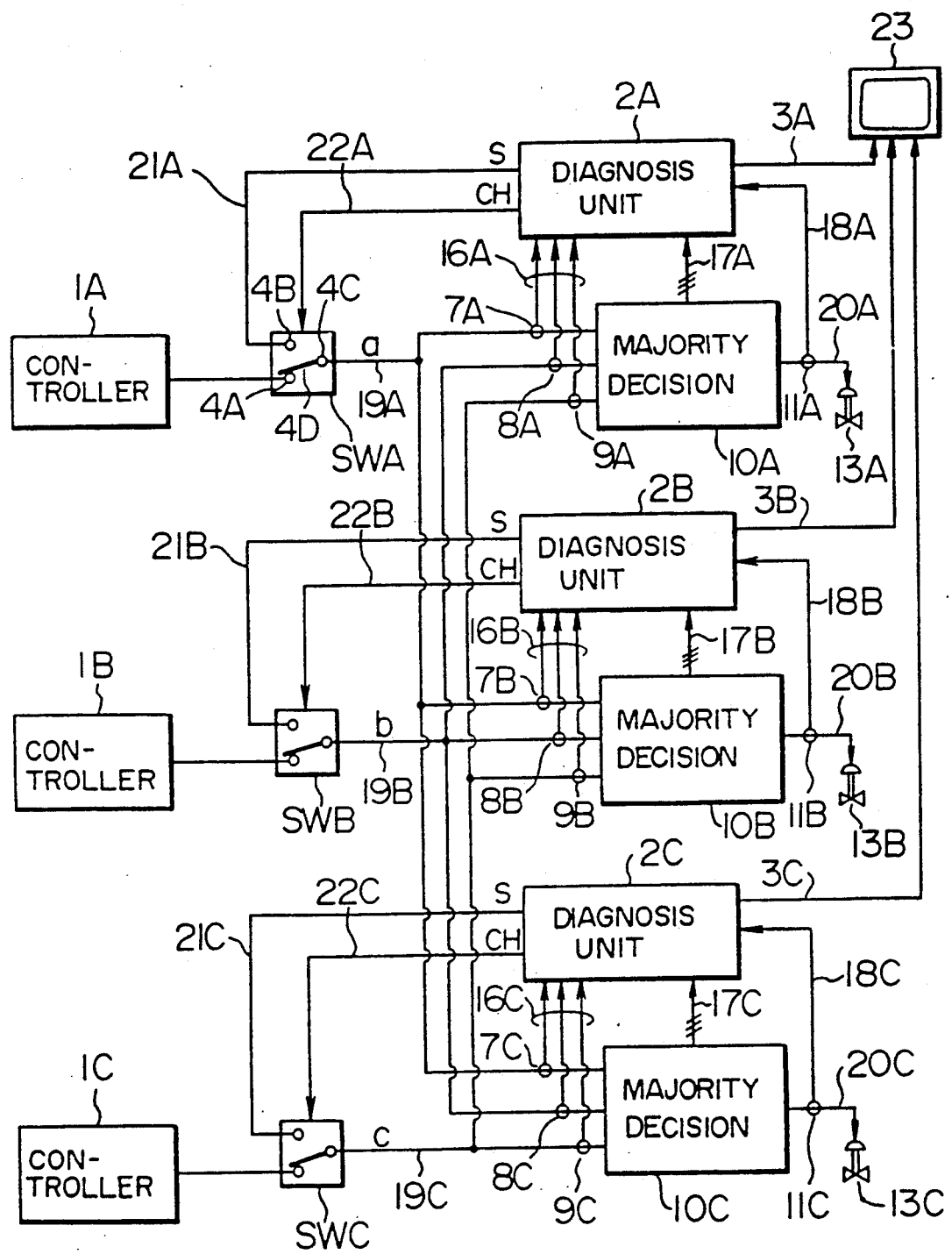
FIG. 1 is a schematic diagram showing an arrangement of a triplex control system according to an exemplary and preferred embodiment of the present invention.

The triplex control system shown in FIG. 1 includes three control apparatuses (controllers) 1A, 1B and 1C and majority decision circuits 10A, 10B and 10C, being disposed in parallel with one another. In the case of the instant embodiment, the control apparatus 1A is associated with the majority decision circuit 10A in a pair. Similarly, the control apparatus 1B is paired with the majority decision circuit 10B, while the control apparatus 1C is associated with the majority decision circuit 10C. Besides, the control apparatus 1A is provided with a diagnosis unit 2A in a paired form. Similarly, the control apparatus 1B is paired with a diagnosis unit 2B, while the control apparatus 1C is provided with a diagnosis unit 2C. In other words, the diagnosis units are provided in a number corresponding to the redundancy with which the control system is implemented.

The control apparatus 1A is connected to a stationary contact 4A of a change-over switch SWA which includes the other stationary contacts 4B and 4C and a movable contact 4D having one end connected to the stationary contact 4C. The other end of the movable contact 4D is adapted to be exchangeably connected to either the stationary contact 4A or 4B. Change-over switches SWB and SWC connected to the control apparatuses 1B and 1C, respectively, are implemented in the same structure as the change-over switch SWA. A wiring conductor 19A connected to the stationary contact 4C of the change-over switch SWA is connected to the majority decision circuit 10A. Similarly, wiring conductors 19B and 19C connected to the change-over switches SWB and SWC, respectively, lead to the majority decision circuits 10A to 10C, respectively.

Figure 2:
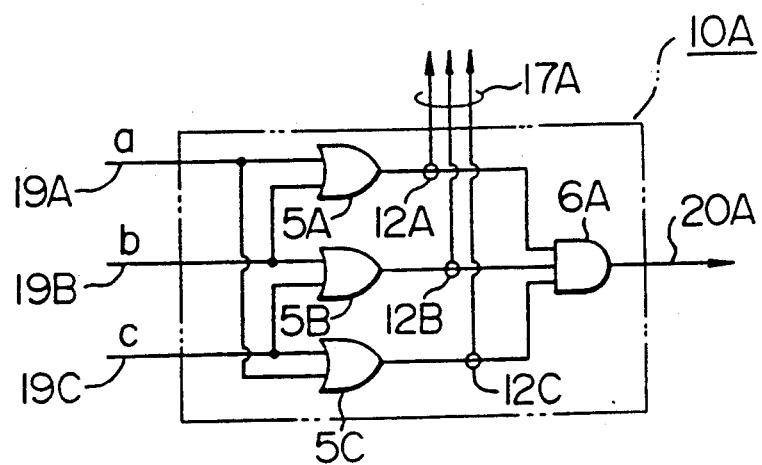
FIG. 2 is a circuit diagram showing a structure of a majority decision circuit employed in the control system shown in FIG. 1.

FIG. 2 shows an exemplary circuit configuration of the majority decision circuit 10A. As will be seen in this figure, the majority decision circuit 10A is composed of logical sum elements or OR gates 5A to 5C connected in parallel and a logical product element or AND gate 6A having inputs connected to the outputs of the OR gates 5A to 5C, respectively. In other words, the majority decision circuit 10A is implemented in the form of a 2-out-of-3 voting logic device. The input terminals of the OR gate 5A are connected to the wiring conductors 19A and 19B, respectively. Similarly, the input terminals of the OR gate 5B are connected to the wiring conductors 19B and 19C, respectively, while those of the OR gate 5C are connected to the wiring conductors 19C and 19A, respectively. It should be mentioned that the majority decision circuit 10B and 10C are implemented in the same configuration as the majority decision circuit 10A. As described previously, each of the majority decision circuits 10A, 10B and 10C realizes the 2-out-of-3 voting logic. The output terminal of the AND gate 6A which constitutes the output terminal of the majority decision circuit 10A is connected to a valve 13A to be controlled through a wiring conductor 20A. In the similar manner, a valve 13 to be controlled is connected to the output terminal of the majority decision circuit 10B through a wiring conductor 20B, while a valve 13C subject to the control is connected to the majority decision circuit 10C by way of a wiring conductor 20C.

Turning to FIG. 1, a signal detector 7A is provided in association with the wiring conductor 19A leading to the input of the majority decision circuit 10A. Further, a signal detector 8A is provided for the wiring conductor 19B while a signal detector 9A is provided in association with the wiring conductor 19C. In the similar manner, signal detectors 7B, 8B are provided in association with the wiring conductors 19A, 19B and 19C, respectively, on the input side of the majority decision circuit 10B, while signal detectors 7C, 8C and 9C are provided for the conductor 19A, 19B and 19C, respectively, on the input side of the majority decision circuit 10C, as is shown in FIG. 1. It is also noted that signal detectors 11A, 11B and 11C are provided in association with wiring conductors 20A, 20B and 20C connected to the output terminals of the majority decision circuit 10A, 10B and 10C, respectively. Besides, signal detectors 12A, 12B and 12C are provided on the output sides of the OR gates 5A, 5B and 5C, respectively, in the majority decision circuit 10A, as shown in FIG. 2. It should be understood that these sorts of the signal detectors 12A, 12B and 12C are also provided in the majority decision circuits 10B and 10C, respectively, in the same arrangement as in the case of the majority decision circuit 10A. Each of the signal detectors mentioned above may be constituted by a device designed to measure directly the potential at the associated circuit point for detecting a signal or alternatively by a device designed to measure the current flowing through the associated circuit point in a contactless manner. It is however preferred that a contactless current transformer typical of the latter should be employed as the signal detector because the current transformer type signal detector is capable of measuring the current regardless of whether the current to be measured is an AC or a DC current. Besides, because of the contactless measurement, any failure in the signal detector itself would exert no adverse influence to the associated control channel. In other words, the triplex control system need not be operated in a common mode even when failure occurs in any one of the signal detectors, to advantage. More preferably, the contactless signal detector can be constituted by a CT current sensor disclosed, for example, in a Japanese literature entitled "Sensor Interfacing", No. 3, pp. 111-116 (published Feb. 2, 1987). In particular, it is noted that the CT current sensor disclosed in the above literature incorporates no power supply source, which is very favorable to the triplex control system in which the common mode should be evaded to the limit of possibility.

The signal detectors 12A, 12B and 12C serve as means for detecting the output signals of the logical elements (i.e. OR gates 5A, 5B and 5C) of the majority decision circuit 10A to thereby output detection signals designated collectively by 17A. On the other hand, the signal detector 11A serves as a means for detecting the output signal of the logical element (AND gate 6A) constituting other part of the majority decision circuit 10A to thereby output a detection signal designated by a symbol 18A in FIG. 1. The signal detectors 7A, 8A and 9A serve to detect three signals (i.e. signals a, b and c) inputted to the majority decision circuit 10A through the wiring conductors 19A to 19C, respectively, to thereby output signals designated collectively by a symbol 16A. The detection signals 16A, 17A and 18A are supplied to the diagnosis unit 2A. Similarly, the detection signals 16B, 17B and 18B produced, respectively, by the signal detectors 7B to 9B, the signal detectors 12A to 12C incorporated in the majority decision circuit 10B and the signal detector 11B are supplied to the diagnosis unit 2B. On the other hand, the detection signals 16C, 17C and 18C produced, respectively, by the signal detectors 7C to 9C, the signal detectors 12A to 12C incorporated in the majority decision circuit 10C and the signal detector 11C are supplied to the diagnosis unit 2C.

Figure 3:
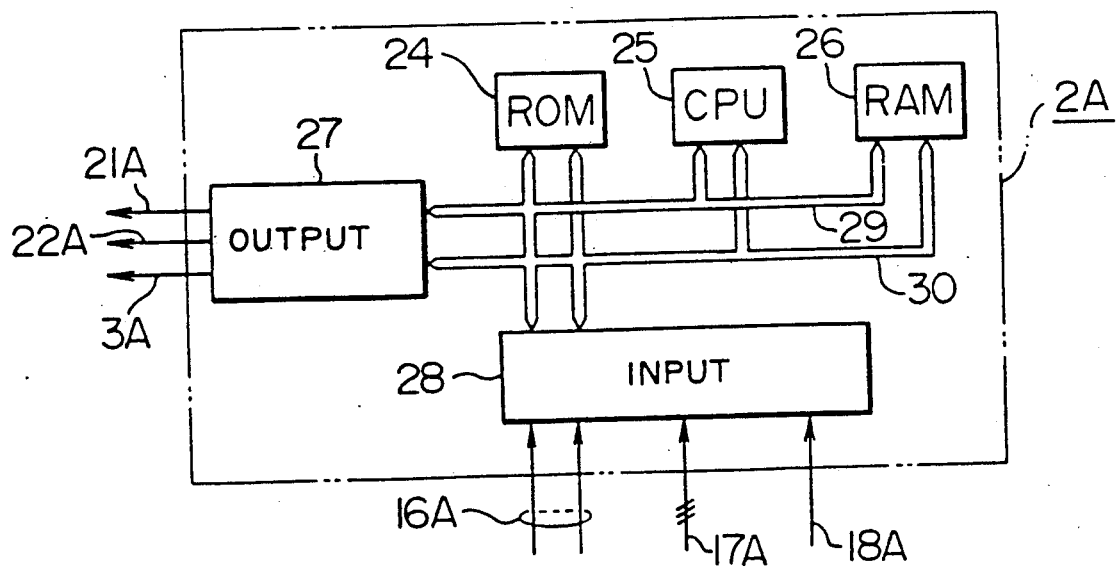
FIG. 3 is a circuit diagram showing a structure of diagnosis unit employed in the control system shown in FIG. 1.

Referring to FIG. 3, the diagnosis unit 2A is constituted by a microprocessor (microcomputer) and includes a read-only memory or ROM 24, a central processing unit (CPU) 25, a random access memory (RAM) 26, an output circuit 27 and an input circuit 28, wherein these components are interconnected by an address bus 29 and a data bus 30. The detection signals 16A, 17A and 18A mentioned above are applied to the input circuit 28. The ROM 29 serves to store a processing procedure illustrated in FIG. 4 and the states of the individual detection signals (shown in FIG. 5) which must make appearance in the normal operation. The CPU 25 executes arithmetic operations in accordance with the processing procedure illustrated in FIG. 4. The RAM 26 serves to store temporarily the data inputted through the input circuit or interface 28 as well as the results of the arithmetic operation performed by the CPU 25. The wiring conductor 3A, 21A and 22B are connected to the output circuit or interface 27. More specifically, the wiring conductor 3A is connected to a display unit 23 for transmitting information concerning the results of the abnormality decision made by the diagnosis unit 10A to a display unit 23. The wiring conductor 21A is connected to the stationary contact 4B of the change-over switch SWA and carries a test signal S. The wiring conductor 22B is connected to the change-over switch SWA and carries a test command signal CH.

The other diagnosis unit 2B and 2C are realized in the same structure as the diagnosis unit 2A and serve for the same functions as those of the diagnosis unit 2A, which will be described in more detail later on. The wiring conductors 3B, 21B and 22B are connected to the output interface 27 of the diagnosis unit 2B. The other end of the wiring conductor 3B is connected to the display unit 23, while that of the wiring conductor 21B is connected to the stationary contact 4B of the change-over switch SWB. Further, the wiring conductor 22B is also connected to the change-over switch SWB as shown in FIG. 1. The wiring conductor 3C connected to the display unit 23, the wiring conductor 21C connected to the stationary contact 4B of the change-over switch SWC and the wiring conductor 22C also connected to the change-over switch SWC have respective other ends connected to the output circuit 28 of the diagnosis unit 2C. The signals carried by the wiring conductors 3B and 3C, respectively, are same as the signal transmitted through the wiring conductor 3A. Further, the signals transmitted through the wiring conductors 21B and 21C, respectively, are same as the signal transmitted through the wiring conductor 21A, while the signals on the wiring conductors 22B and 22C are same as the signal carried by the wiring conductor 22A.

Next, description will be directed to the operation of the triplex control system according to the instant embodiment of the present invention. The functions or operations of the control apparatuses or controllers, the diagnosis units, the change-over switches and the majority decision circuits 10 each provided in triplex are identical among the three control channels. Accordingly, the following description concerning operation of the control system will be made by reference to the channel including the control apparatus 1A, the diagnosis unit 2A and the majority decision circuit 10, being understood that the same applies true to the corresponding components of the other channels.

The control apparatus or controller 1A is supplied as the input signal thereto with measurement signals produced by sensors (not shown) installed in the plant to thereby output a signal a for controlling the opening degrees of the valves 13A, 13B and 13C, respectively. The change-over switch SWA is maintained in the state in which the movable contact 4D is connected to the stationary contact 4A so long as the test command signal CH outputted from the diagnosis unit 2A is absent. Consequently, the signal a outputted from the control apparatus 1A is supplied to the input of the majority decision circuit 10A by way of the change-over switch SWA and the wiring conductor 19A. At the same time, a signal b outputted from the control apparatus 1B is supplied to the input of the majority decision circuit 10A. Besides, a signal c produced by the control apparatus 1C is also supplied to the majority decision unit 10A. It should be noted that the signals a, b and c are also supplied to the majority decision circuit 10B and 10C simultaneously. The signals a, b and c are digital signals each including logic "0" and logic "1" levels.

The majority decision circuit 10A constitutes a sort of signal selecting means arranged so as to decide whether the three input signals coincide with one another to thereby output as a correct control signal which corresponds to at least two inputs which coincide with each other. (Same holds true for the majority decision circuits 10B and 10C.) More specifically when at least two of the three input signals a, b and c are logic "1", the majority decision circuit 10A selects the logic "1" signal as the control signal for the valve 13A. On the other hand, when at least two of the three input signals a, b and c are logic "0", the majority decision circuit 10A selects the signal of logic "0" as the control signal to be supplied to the valve 13A. When the signal outputted from the majority decision circuit 10A is logic "1", the valve 13A is opened, while it is closed when the output signal from the majority decision circuit 10A is logic "0".

Figure 4:
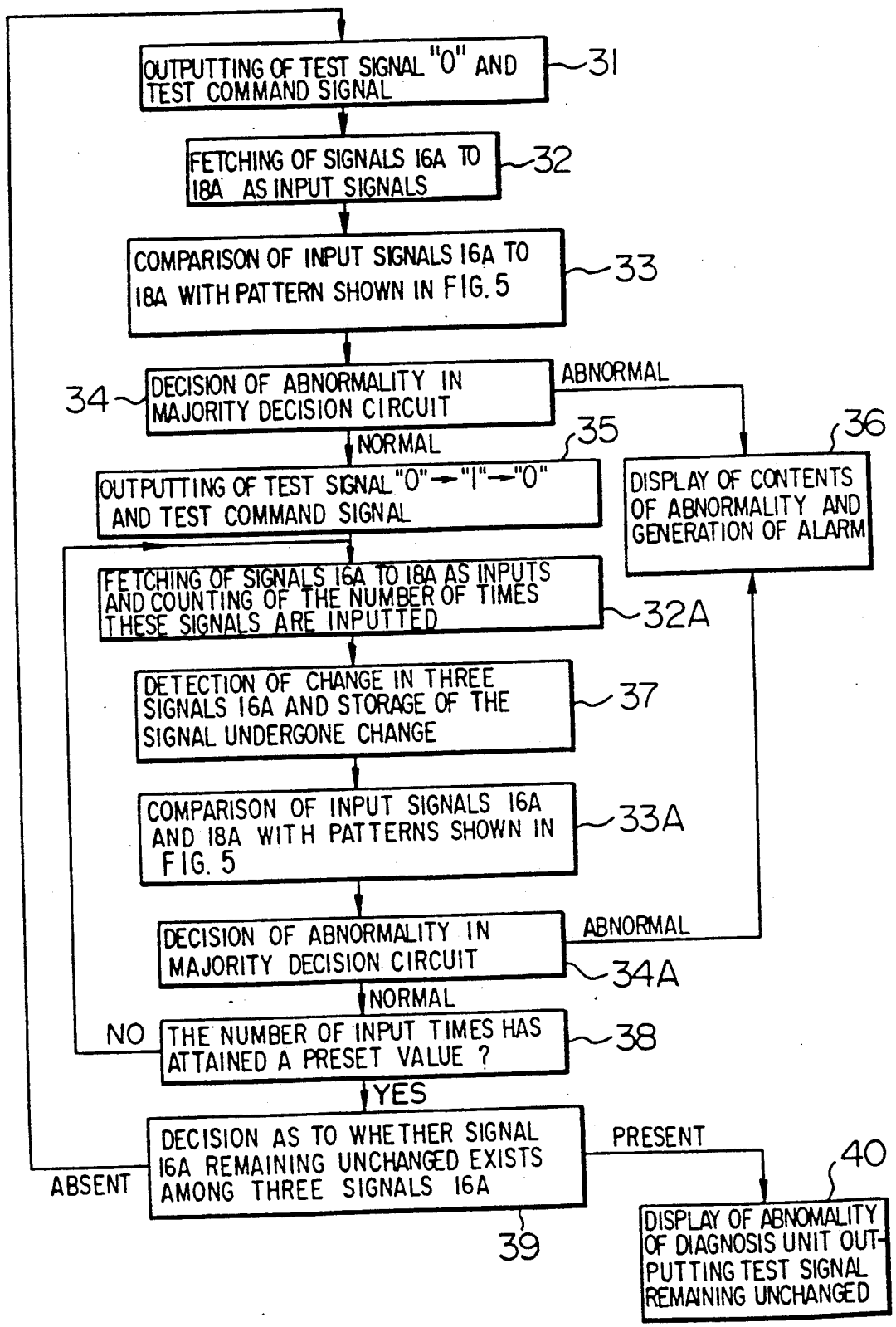
FIG. 4 illustrates in a flow chart a processing procedure executed by the diagnosis unit.

The operation described above represents a normal control operation of the triplex control system according to the instant embodiment of the invention. The following description will be turned to the diagnosis function for the majority decision circuits (10) of the triplex control system for deciding the presence or absence of abnormality in these majority decision circuits. The diagnosis for determining the presence or absence of abnormality is performed by the diagnosis units 2A, 2B and 2C, respectively. FIG. 4 shows a processing procedure which can be executed by the diagnosis unit 2A to this end. Of course, the processing procedure shown in FIG. 4 also applies valid to the diagnosis unit 2B by reading "signals 16A to 18A" occurring in FIG. 4 as "signal 16B to 18B", respectively. Similarly, the processing procedure performed by the diagnosis unit 2C corresponds to the procedure shown in FIG. 4 by replacing "signals 16A to 18A" by "signal 16C to 18C", respectively.

Figures 5, 6:
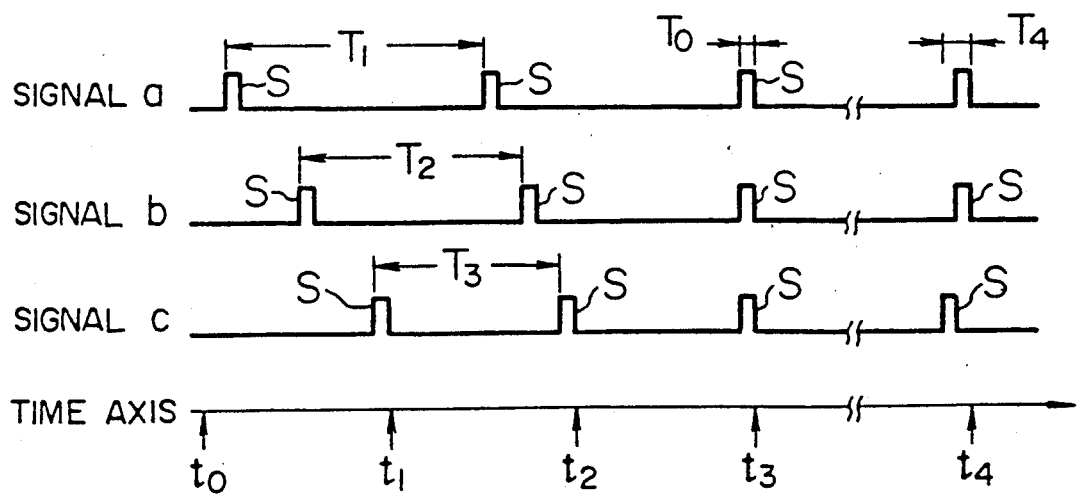
FIG. 5 is a view for illustrating signal patterns stored in the ROM of the diagnosis unit shown in FIG. 3 and indicating the normal state of the majority decision circuit.
FIG. 6 shows in a timing diagram the waveforms of test signals outputted from change-over switches shown in FIG. 1.

In the diagnosis unit 2A, the processing based on the procedure illustrated in FIG. 4 and stored in the ROM 21 is executed by the CPU 25. At first, the CPU 25 outputs the test signal S of logic "0" on the wiring conductor 21A for diagnosing the triplex control system (more specifically, the majority decision unit and the diagnosis unit) as to the presence of abnormality, while outputting the test command signal CH onto the wiring conductor 22A (step 31 in FIG. 4). The outputting of the test signal S of logic "0" is equivalent to the state in which a pulse-like test signal S for the diagnosis of abnormality as described hereinafter is not outputted. The test signal S of the logic "0" is applied to the stationary contact 4B of the change-over switch SWA. In this state, the movable contact 4D of the change-over switch SWA is connected to the stationary cotact 4B in response to the test command signal CH. Upon interruption in the outputting of the test command signal CH, the movable contact 4D of the change-over switch SWA is connected to the stationary contact 4A. The time interval or period during which the movable contact 4D remains in the state connected to the stationary contact 4B is equal to a pulse width or duration $T_o$ of the pulse-like test signal S described hereinafter. By virtue of this feature, the valve 13A opened in response to the control signals (of logic "1") issued by the control apparatuses 1A and 1B is prevented from being closed even when the test signals of logic "0" contained in the signals a, b and c should overlap each other. The change-over switch SWA responds to the input of the test command signal CH by outputting the test signal S of logic "0" as the signal a in place of the output signal from the control apparatus 1A. This signal a is supplied to the majority decision circuits 10B and 10C as well. At a step 32, the diagnosis unit 2A fetches the following data signals. In other words, the detection signals 16A produced by the signal detectors 7A, 8A and 9A, the detection signals 17A outputted from the signal detectors 12A, 12B and 12C incorporated in the majority decision circuit 10A and the signal 18A outputted from the signal detector 11A are once loaded in the RAM 26 by way of the input circuit 28 and the data bus 30. The CPU 25 compares the input signals 16A to 18A with the output patterns (patterns labelled No. 1 to 8 shown in FIG. 5) of these signals in the normal state of the majority decision circuit 10A (step 33). Subsequently, decision is made as to the presence or absence of abnormality in the majority decision circuit 10A (step 34). In this conjunction, it is assumed, by way of example, that the detection signals of the signal detectors 7A to 9A (the input signals to the majority decision circuit 10A) are all of logic "0" as in the case of the pattern No. 1 shown in FIG. 5. It is then decided that the majority decision circuit 10A functions normally without suffering from any abnormality when the detection signals of the signal detectors 12A to 12C and 18A (output signal of the individual logical elements constituting the majority decision circuit 10A) are all of logic "0". On the other hand, when the detection signal of the signal detector 12B is logic "1", this means that discrepancy with the pattern No. 1 shown in FIG. 5 is present. In that case, it is decided at a step 34 that the OR gate 5B of the majority decision circuit 10A suffers from abnormality. Next assuming, by way of another example, that the output signal 18A of the signal detector 11A is logic "1", there exists discrepancy with the pattern labelled No. 1 (FIG. 5). Thus, decision can be made to the effect that abnoramlity is present in the AND gate 6A of the majority decision circuit 10A. When it is decided at the step 34 that abnormality is present, the component of the majority decision circuit 10A which suffers from abnormality is informed to the display unit 23 by way of the output circuit 27 and the wiring conductor 3A (step 36). The display unit 23 responds thereto by display the abnormal component of the majority decision circuit 10A. An alarm may also be produced at the step 36.

When the decision made at the step 34 results in the absence of abnormality, the processing procedure proceeds to a step 35. In this step 35, the pulse-like test signal S including a row of logic "0", "1" and "0" levels in this sequence is issued from the output circuit 27 of the diagnosis unit 2A to be applied by way of the wiring conductor 21A to the change-over switch CH, whereupon the change-over switch SWA transmits the pulse-like test signal S as the signal a to each of the majority decision circuits. At a step 32A, the detection signals 16A to 18A detected by the respective signal detectors are inputted simultaneously (i.e. the signals detected at a same time point are inputted) to the diagnosis unit 2A be stored in the RAM 26 as in the case of the step 32 described previously. At the same time, the number of times the detection signals 16A to 18A are inputted in succession to the output of the pulse-like test signal S are counted at the step 32A, wherein the counted number is stored in the RAM 26. At a succeeding step 37, each of the signals 16A outputted from the signal detectors 7A to 9A, respectively, is checked as to whether the signal 16A has undergone any change when compared with the state of the same signal inputted at the last (preceding) time point. The signal 16A undergone the change is stored in the RAM 26. It is however to be noted that the signal 16A undergone no change may alternatively be stored in the RAM 26. In steps 33A and 34A, the processings similar to those described above in conjunction with the steps 34 and 35 are performed. The processing at the step 37 may be executed in succession to the step 34A.

At a step 38, the number of times the detection signals 16A to 18A are inputted to be stored in the RAM 26 is compared with a preset number of times, whereby decision is made as to whether the number of times the signals are inputted has attained the predetermined number. Unless the number of times the detection signals were inputted has reached the predetermined number, the processing steps 32A, 37, 33A, 34A and 38 are repeatedly executed. When it is decided at the step 38 that the number of times the signals were inputted has attained the predetermined number, then a step 39 is performed. At this step 39, it is decided whether there exists among the three signals 16A detected and stored in the RAM 26 at the steps 37 any signal that has undergone no change. This decision in its essence is equivalent to the decision made as to the presence or absence of the abnormal diagnosis unit which produces constantly the test signal S undergone no change among the diagnosis unit 2A, 2B and 2C which output the respective pulse-like test signals S, the reason for which will be explained in detail later on. In case the change had occurred in all of the three signals 16A until the number of the times the signals are inputted has attained the predetermined number or count, this means that all of the diagnosis units 2A, 2B and 2C function normally. In this case, the processing at the step 31 is resumed, whereupon the succeeding steps are executed sequentially. On the other hand, when it is decided at the step 39 that there exists the signal 16A undergone no change, abnormality of the diagnosis unit outputting the test signal S onto the wiring conductor (at least one of the wiring conductors 19A, 19B and 19C) which is associated with the signal detector (at least one of the signal detectors 7A, 8A and 9A) detecting the signal 16A undergone no change is displayed on the display unit 23 (step 40).

The processing procedure illustrated in FIG. 4 is executed by the diagnosis units 2B and 2C as well. In response to application of the pulse-like test signals from the diagnosis units 2A, 2B and 2C, the signals a, b and c each containing the pulse-like test signal, as is illustrated in FIG. 6, are outputted from the change-over switches SWA, SWB and SWC, respectively. In conjunction with FIG. 6, it will be noted that the control signals of logic "1" outputted from the control apparatuses 1A, 1B and 1C when the associated movable contacts 4D are connected to the stationary contacts 4A of the associated change-over switches SWA, SWB and SWC are omitted from illustration. The diagnosis units 2A, 2B and 2C operate asynchronously with one another to output the test signals S and the test command signals CH. Consequently, the signals a, b and c outputted from the associated change-over switches include the pulse-like test signals of different periods (i.e. the pulse-like test signals having different periods $T_1$, $T_2$ and $T_3$) which are outputted from the diagnosis units 2A, 2B and 2C, respectively. Each of the pulse-like test signals S is a pulse signal having such a duration $T_o$ (not longer than 100 ms in the case of the instant embodiment) during which the devices to be controlled (i.e. the valves 13A to 13C in the case of the instant embodiment) can remain inoperative even when the signals a, b and c overlap one another, as indicated at a time point $t_3$. The individual signals shown in FIG. 6 represent the state in which the pulse-like test signals outputted from the associated diagnosis units are applied through corresponding manipulation of the change-over switches, wherein the control signal of logic "1" transmitted from the control apparatus when the movable contact 4D of the associated change-over switch is connected to the stationary contact 4A to which the abovementioned control apparatus is connected (i.e. the state intervening two successive pulse-like test signals) is omitted from illustration. Additionally, the individual signals shown in FIG. 6 indicate the state in which the control signal of logic "1" is not outputted from the control apparatus between the two successive pulse-like test signals S (i.e. the state in which only the control signal of logic "0" is outputted). It should further be mentioned that the test signal of logic "0" outputted at the step 31 is produced in precedence to the pulse-like test signal shown in FIG. 6.

As will be seen in FIG. 6, the pulse-like test signal c is of the shortest period $T_3$ among the signals a, b and c. The time interval (period $T_3$) between two successive pulse-like test signals S in the signal c is so selected that a series of steps intervening between the step 35 being currently executed and the same step 35 to be executed at the next cycle in the procedure shown in FIG. 4 can be executed within this period $T_3$. The test signal S and the test command signal CH shown in the step blocks 31 and 35 in FIG. 4 are generated by an oscillator (omitted from illustration of the diagnosis unit shown in FIG. 3 but shown in FIG. 8 as referred to later on) and outputted from the diagnosis unit at the time interval corresponding to a predetermined number of pulses as detected by a counter (not shown in FIG. 3 but described hereinafter in conjunction with another embodiment shown in FIG. 8). Inputting of the signals 16A to 18A at the steps 32 and 32A is also performed at a time interval corresponding to a predetermined number of pulses detected by another counter (also not shown in FIG. 3). The outputs of the counters mentioned above are supplied to the CPU 25 by way of the data bus 30.

Next, operation of the diagnosis unit for deciding the presence or absence of abnormality in the very diagnosis unit will be described. The signal a containing the pulse-like test signal S outputted from the diagnosis unit 2A periodically at the time interval $T_1$ is detected by the signal detectors 7B and 7C to be subsequently inputted to the diagnosis units 2B and 2C, respectively. Thus, the diagnosis unit 2B as well as 2C can decide the presence or absence of abnormality in the diagnosis unit 2A by detecting whether the input signal a has changed its state from logic "0" to logic "1" or vice versa until the number of times the signals 16A to 18A were inputted has attained the predetermined number or count, as determined at the step 32A. As the abnormality of the diagnosis unit, there may be mentioned abnormality or malfunction of the ROM 24, the CPU 25, the output circuit 27 and the data bus 30. It goes without saying that such abnormality of the diagnosis unit 2A can also be determined by the diagnosis unit 2A itself. The decision made at the step 38 that the number of times the signal were inputted has attained a predetermined value in turn means that a predetermined time has lapsed after the pulse-like test signal S was outputted. In case no test signal is outputted from the diagnosis unit 2A, the signal detector 7A detects the output signal of the control apparatus 1A to thereby input that signal to the diagnosis unit 2A, which is however incapable of deciding whether the signal incoming from the signal detector 7A is whether the test signal or the control signal. In this conjunction, it is noted in general that the control apparatus 1A continues to output the signal of logic "0" or alternatively logic "1" in the steady state except for the transient state. Accordingly, abnormality of the diagnosis unit can be decided when the control signal outputted from the control apparatus 1A is in the steady state. The foregoing holds true for the control apparatuses 1B and 1C and the diagnosis units 2B and 2C.

Each of the diagnosis units according to the instant embodiment can detect the presence or absence of abnormality as well as the malfunctioning component in the majority decision circuits 10A to 10C on the basis of the patterns illustrated in FIG. 5 with the aid of the input signals 16A to 18A not only in the state where only the test signal S is outputted but also in the state where only the control signals are outputted from the control apparatus 1A to 1C as well as in the state where the control signals are issued as mixed with the test signal.

The diagnosis units 2A to 2C according to the instant embodiment of the invention are arranged to output the test signal in place of the corresponding control apparatuses 1A to 1C. With the aid of the test signal as outputted, the diagnosis units 2A, 2B and 2C can be inputted with the detection signals 16A to 18A constituting all the patterns Nos. 1 to 8 illustrated in FIG. 5, whereby decision can be made as to the presence or absence of abnormality in the majority decision circuits 10A to 10C for all the modes of the input signals thereto and hence the presence or absence of the abnormality in the individual logical elements constituting the majority decision circuits 10A to 10C. According to the instant embodiment of the invention, the decision as to the presence or absence of abnormality can be made by utilizing the output signals of the control apparatuses 1A to 1C as well. In that case, however, the abnormality decision can not be executed for all the patterns mentioned above because the forms of the output signals of the control apparatuses 1A to 1C are limited inherently.

Further, according to the instant embodiment of the invention, the triplex control system can be simplified with regard to the structure because of no necessity for providing any change-over switch between each majority decision circuit and each device to be controlled (i.e. the valve in this case) for the purpose of transmitting the output of the majority decision circuit to the relevant diagnosis unit rather than the valve upon occurrence of abnormality.

Figure 8:
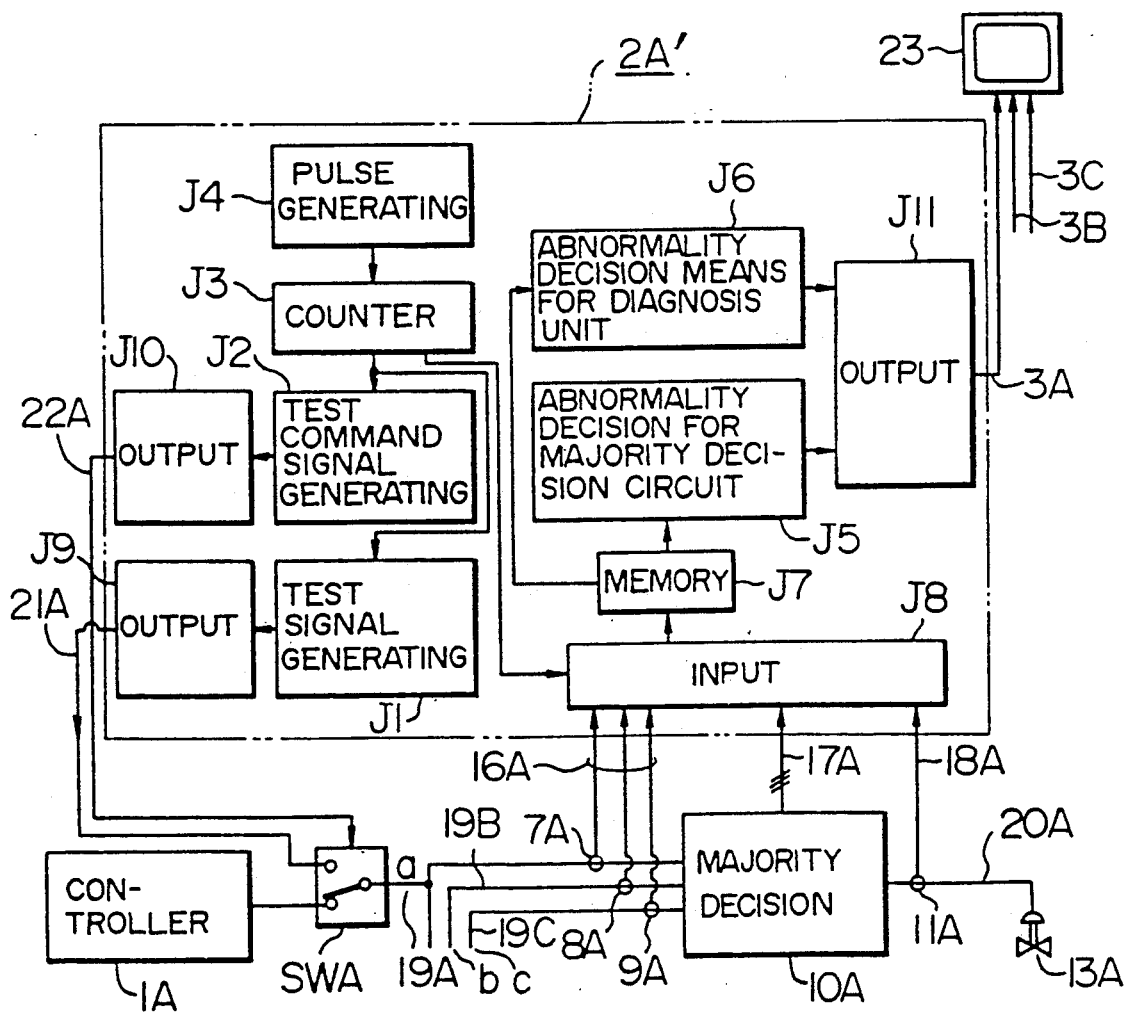
FIG. 8 is a view for illustrating functional arrangement of the diagnosis unit shown in FIG. 3.

Besides, by virtue of such arrangement that the three diagnosis units are provided, respectively, in association with the control apparatuses independent of one another, the probability of the device subject to one another, the probability of the device to be controlled (e.g. valve) being influenced can be significantly lowered, even when the abnormal test signal is inputted to the majority decision unit upon occurrence of abnormality in one of the diagnosis units (failure or malfunction in at least one of the CPU 25, the bus 30, the output circuit 27 and the aforementioned counters although not shown in the case of the system under consideration or failure in at least one of a test signal generating means J1, a test command signal generating means J2, a counter J3 and output circuits J9, J10 and others described hereinafter in conjunction with FIG. 8). This advantageous feature is ascribable to such arrangement of the control system according to the instant embodiment that the diagnosis units are prevented from operating in a common mode to all the control apparatuses 1A to 1C, whereby one of the majority decision circuits is always supplied with two normal signals (i.e. the test signal outputted from the test signal generating means of the diagnosis unit and two of the control signals outputted from the two control apparatuses connected to the two corresponding change-over switches to which the output signals of the two diagnosis units suffering no abnormality are connected in the case of the instant embodiment). The bus 30, the output circuit 27 and the counters cooperate with each other to constitute a means or mechanism for applying the test signal for the abnormality diagnosis to the majority decision circuit which serves as the signal selecting circuit.

According to the instant embodiment of the invention, the time width or duration $T_o$ of the pulse-like test signal S is so selected that the device to be controlled can not be activated. Thus, any failure in one of the diagnosis units could never lead to operation of the device under the control.

Further, in the instant embodiment, the periods or time intervals at which the pulse-like test signals are outputted from the diagnosis units 2A, 2B and 2C, respectively, are previously so established as to differ from one another. Accordingly, various combinations of the pulse-like test signals S such as illustrated in FIG. 6 can be obtained, whereby the diagnosis with the various patterns shown in FIG. 5 can be correspondingly facilitated.

The abnormality decision for the majority decision circuits and the diagnosis units as described hereinbefore can be carried out regardless of whether the triplex control system is in the state capable of performing the control operation or in the state receiving maintenance and/or inspection.

Since the individual diagnosis units as well as the control apparatuses operate in asynchronism with one another, occurrence of the common mode due to synchronization can be prevented positively, whereby the reliability is enhanced.

Further, according to the instant embodiment of the invention, establishment of the various types of common modes can be avoided, which means that the reliability of the triplex control system can be significantly enhanced.

In the foregoing description of the instant embodiment, it has been assumed that the valves 13A, 13B and 13C are opened in response to the signal of logic "1" while they are closed with the signal of logic "0". It should however be understood that the valves can be set to the open state in response to the signal of logic "0" while being closed with the signal of logic "1".

Figure 7:
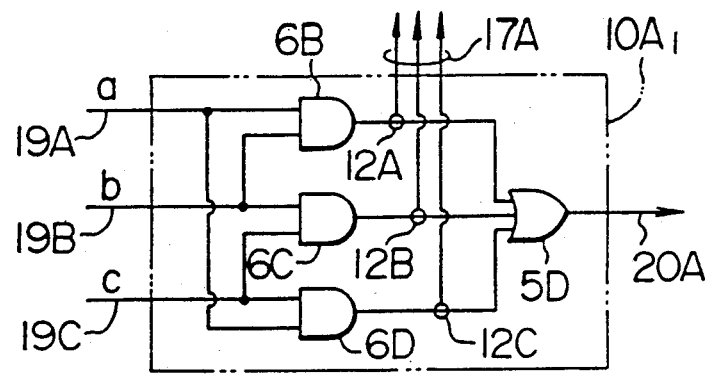
FIG. 7 is a schematic circuit diagram showing another configuration of the majority decision circuit.

The majority decision circuit shown in FIG. 2 may be replaced by a majority decision circuit $10A_1$ shown in FIG. 7. Same holds true for the other majority decision circuits 10B and 10C. Referring to FIG. 7, the majority decision circuit $10A_1$ is constituted by three AND gates 6B, 6C and 6D and an OR gate 5D which is so arranged as to receive at the inputs thereof the outputs of the AND gates 6B, 6C and 6D. The signal detectors 12A, 12B and 12C detect the outputs of the AND gates 6B, 6C and 6D, respectively. The output terminal of the OR gate 5D is connected to the wiring conductor 20A. On the other hand, the wiring conductors 19A, 19B and 19C are connected to the input terminals of the AND gates 6B to 6C in such manner as shown in FIG. 7.

When the outputs of three OR gates of the majority decision circuit 10A (FIG. 2) are so wired as to realize the function of AND gate (i.e. the AND gate based on the wired logic) for thereby replacing the AND gate 6A, the abnormality diagnosis is rendered unnecessary to the AND gate realized in the form of the wired logic. Consequently, the signal detector 11A can be spared.

FIG. 8 illustrates in a functional diagram the functions of the diagnosis unit 2A of the control system shown in FIG. 1. The following description made with reference to FIG. 8 applies valid to the diagnosis units 2b and 2C as well. In a diagnosis unit 2A' representing functionally the diagnosis unit 2A, the pulses outputted from a pulse generating means J4 are counted by a counter means J3. When the number of the counted pulses has attained a first predetermined value, the counter means J3 produces a signal to both of test signal generating means J1 and test command signal output means J2. The test signal generating means J1 and the test command signal output means J2 respond to the input of the abovementioned signal by outputting the test signal S and the test command signal CH to the wiring conductors 21A and 22A through the output means J9 and J10, respectively. The input means J8 is supplied with the detection signals 16A to 18A in response to the signal produced when the number of pulses counted by the counting means J3 has attained a second predetermined count value. The detection signal 16A, 17A and 18A thus inputted are once stored in the memory means J7. The data carried by the detection signals 16A to 18A and stored in the memory means J7 are compared with the patterns illustrated in FIG. 5 by the abnormality decision means J5 for the majority decision circuit, whereby decision is made as to presence or absence of abnormality in the majority decision circuit 10. Further, the abnormality decision means J6 for the diagnosis unit detects whether there exists the signal 16A undergone no change among the three signals 16A inputted within a predetermined period. When the signal 16A remaining unchanged over the predetermined period is present, then the decision is made that the diagnosis unit of concern suffers abnormality, as described hereinbefore. The results of the abnormality decisions made by the abnormality decision means J5 and J6, respectively, are outputted to the display unit 23 through the output means J11. The diagnosis units 2B as well as 2C operate similarly to the operation of the diagnosis unit 2A' described above.

In the processing procedure shown in FIG. 4 and executed by the CPU 25 of the diagnosis unit 2A, the function "output of the test signal" in the steps 31 and 35 corresponds to that of the test signal generating means J1, the function "output of the test command signal" in the steps 31 and 35 corresponds to that of the test command signal generating means, the functions in the steps 33, 34, 36, 33A and 34A correspond to those of the abnormality decision means J5, and the function "count of the input pulse number" in the steps 37, 38, 39, 40 and 32A correspond to the function of the abnormality decision means J6. To say in another way, the CPU 25 is imparted with the functions of the various means mentioned above. It will further be seen that the RAM 26 of the diagnosis unit 2A corresponds to the memory means J7, the input circuit 28 corresponds to the input means J8, and the output circuit 27 corresponds to the output means J9 to J11, respectively. A memory not shown but corresponding to the ROM is also provided (for the purpose of storing, for example, the patterns illustrated in FIG. 5). Since the diagnosis unit 2A' incorporates therein both the functions of the test signal generating means and the test command signal generating means, synchronization between these means can be easily realized.

It should be added that the abovementioned various means of the diagnosis unit 2A' may be implemented in hardware structures. Needless to say, employment of the diagnosis unit 2A' of hardware structure in place of the diagnosis units 2A, 2B and 2C shown in FIG. 1, respectively, can assure substantially same advantageous effects as those attainable with the embodiment of the control system shown in FIG. 1.

Figure 9:
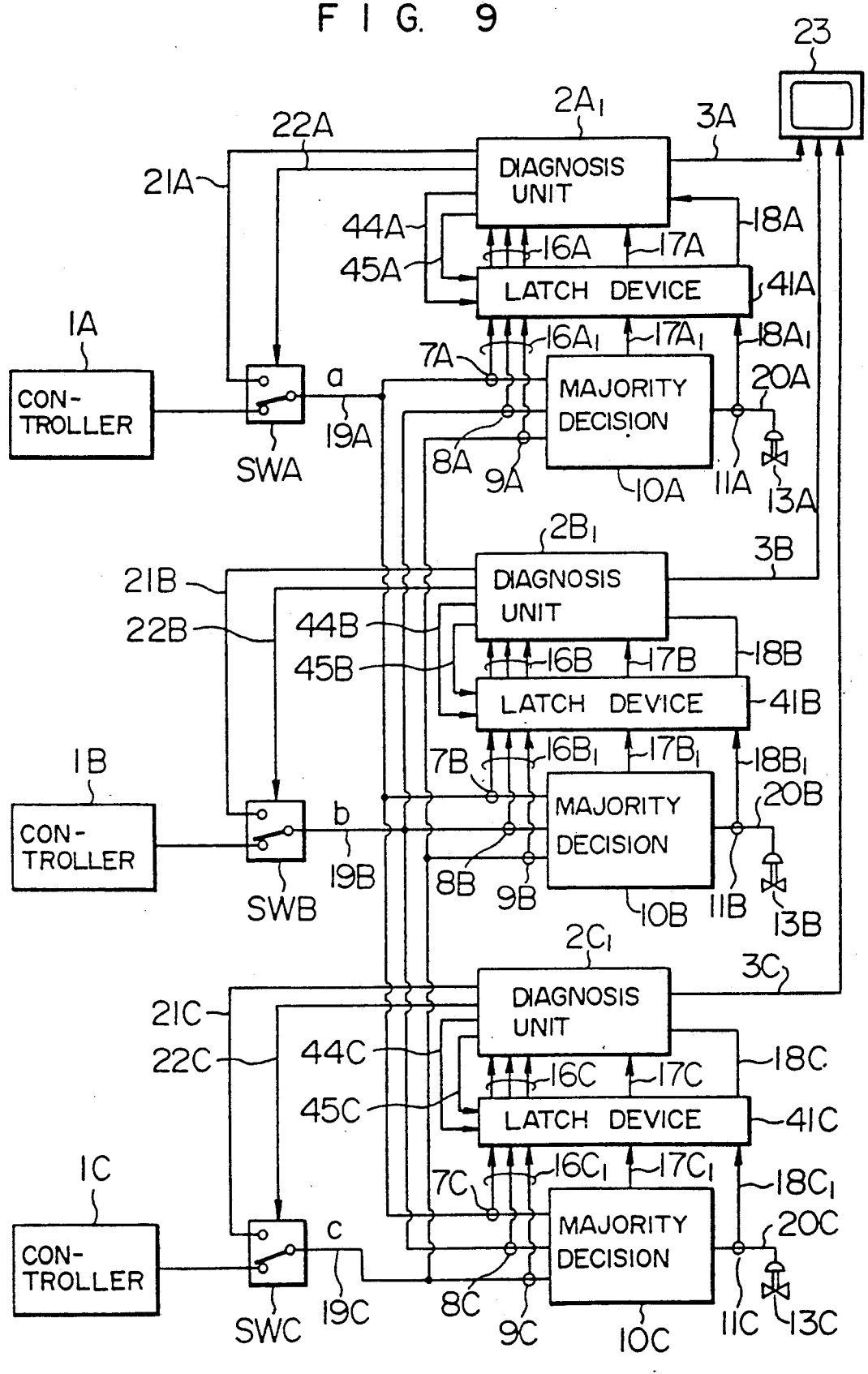
FIG. 9 is a schematic diagram showing a general arrangement of a triplex control system according to another embodiment of the present invention.

FIG. 9 shows another exemplary embodiment of the triplex control system according to the present invention. This embodiment differs from the one shown in FIG. 1 mainly in respect that latch devices 41A, 41B and 41C are provided. The following description will therefore be directed to these differences.

The latch devices 41A, 41B and 41C are implemented in the identical structure with one another. Accordingly, the structure of the latch device 41A will be described in detail by referring to FIG. 10, being understood that the description applies valid to the other latch devices 41B and 41C. The latch device 41 is composed of latch circuits 42A to 42H and an AND gate 43. Each of the latch circuits 42A to 42H may be realized in the form of a flip-flop. The latch circuit 42A is connected to the signal detector 7A. The latch circuit 42B is connected to the signal detector 8A. The latch 42C is connected to the signal detector 9A. The latch 42D is connected to the signal detector 12A. The latch 42E is connected to the signal detector 12B. The latch 42F is connected to the signal detector 12C. Finally, the latch circuit 42H is connected to the signal detector 11A. Additionally, the signal detectors 12A to 12C are also connected to the input terminals of the AND gate 43 which has an output terminal connected to the latch circuit 43G. The latch circuits 42A to 42C of the latch device 41B are connected to the signal detectors 7B, 8B and 9B, respectively, while the latch circuit 42H is connected to the signal detector 11B. On the other hand, the latch circuits 42A to 42C of the latch device 41C are connected to the signal detectors 7C, 8C and 9C, respectively, while the latch circuit 42H thereof is connected to the signal detector 11C. The latch circuits 42E to 42G of the latch devices 42E and 41C, respectively, are connected to the signal detectors 12A to 12C in the manner similar to the latch device 41A.

Figure 11:
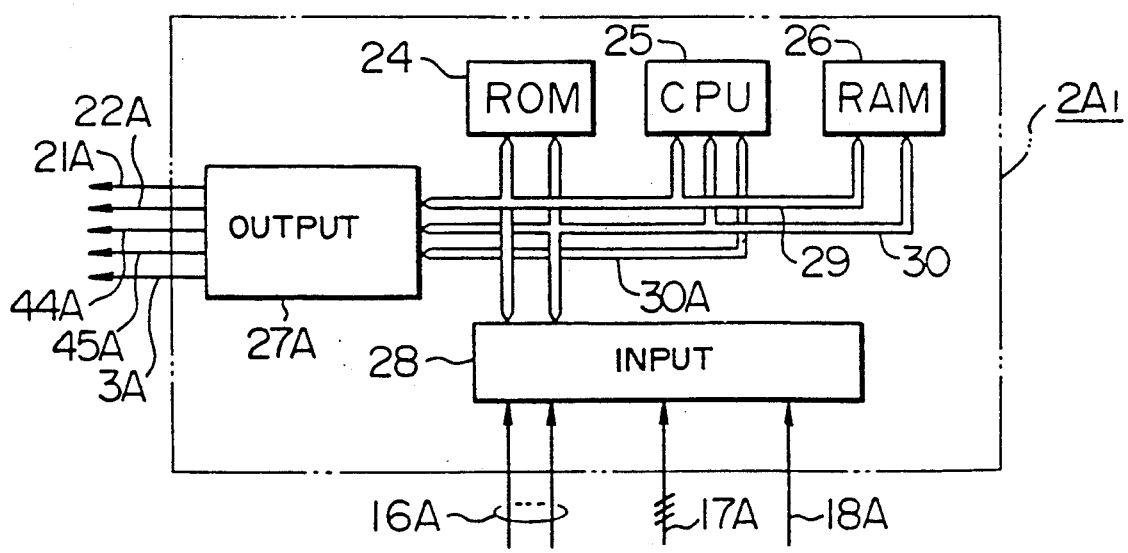
FIG. 11 is a schematic circuit diagram showing a structure of a diagnosis unit employed in the system shown in FIG. 9.

The diagnosis units $2A_1$, $2B_1$ and $2C_1$ each constituted by a microprocessor in the instant embodiment are substantially identical with the diagnosis units 2A, 2B and 2C of the preceding embodiment. Considering the diagnosis unit $2A_1$ shown in FIG. 11, this unit $2A_1$ differs from the diagnosis unit 2A in that a bus 30A is provided and that output means 27A to which wiring conductors 3A, 21A, 22A, 44A and 45A are connected is provided. The wiring conductors 44A and 45A provided additionally are connected to each of the latch circuits 42A to 42H of the latch device 41A. Similarly, the wiring conductors 44B and 45B connected to the output circuit 27A of the diagnosis unit $2B_1$ are connected to the latch circuits 42A to 42H of the latch device 41B. Further, the wiring conductors 44C and 45C connected to the output circuit 27A of the diagnosis unit $2C_1$ are connected to the latch circuits 42A to 42H of the latch device 41C. The output terminals of the latch circuits 41A to 41H of the latch devices 41A, 41B and 41C are connected to the input circuits 28 of the diagnosis unit $2A_1$, $2B_1$ and $2C_1$, respectively.

The functions of the latch devices 41A, 41B and 41C will be described by taking as an example the latch device 41A. The latch circuit 42A of the latch device 41A is supplied with the detection signal 16A from the signal detector 7A connected thereto. When the input detection signal undergoes a change, an edge or transition of the change (e.g. from logic "0" to logic "1") is made use of for holding the state of the detection signal after the transition. The latch circuit 42A stores the state of the detection signal fetched in response to the input of a load signal $L_o$ described hereinafter. Further, the latch circuit 42A resets the signal stored therein to "0" in response to the input of a reset signal $R_I$ supplied from the diagnosis unit $2A_1$ through the wiring conductor 44A. Such functions of the latch circuit 42A are equally imparted to each of the latch circuits 42B to 42H. The latch circuits 42B and 42C are supplied as the inputs thereto with the detection signals 16A generated by the signal detectors 8A and 9A, respectively. The latch circuits 42D to 42F and the AND gate 43 are supplied with the detection signals 17A from the corresponding signal detectors 12A to 12C, respectively. Finally, the latch circuit 42H is supplied with the detection signal 18A generated by the signal detector 11A. The output signal of the AND gate 43 is inputted to the latch circuit 42G. The detection signals 16A stored in the latch circuits 42A to 42C, the detection signals 17A stored in the latch circuits 42D to 42G, the signal outputted from the AND gate 43 and stored in the latch circuit 42 and the detection signal 18A stored in the latch circuit 42H are supplied to the input circuit 28 of the diagnosis unit $2A_1$.

The ordinary control operation of the control system according to the instant embodiment is identical with that of the control system shown in FIG. 1. Due to the operations or actions of the diagnosis units $2A_1$ to $2C_1$, the signals a, b and c containing the pulse-like test signals S as illustrated in FIG. 6 are outputted from the change-over switches SWA, SWB and SWC, respectively, as in the case of the embodiment shown in FIG. 1. The diagnosis units $2A_1$, $2B_1$ and $2C_1$ operate in asynchronism with one another.

Figure 12:
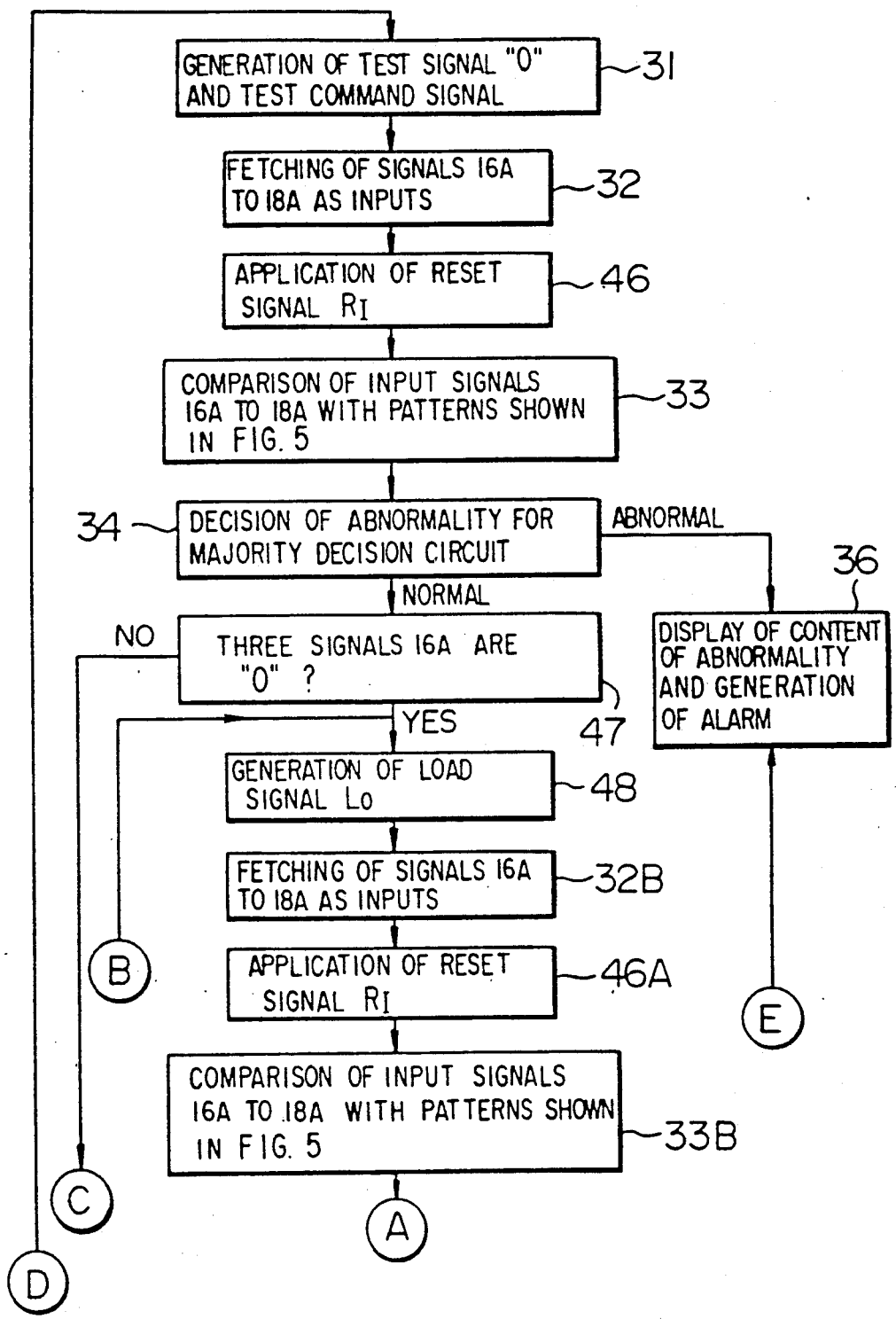
FIGS. 12 and 13 show flow charts for illustrating processing procedures executed by the diagnosis unit in the system shown in FIG. 11.
Figure 13:
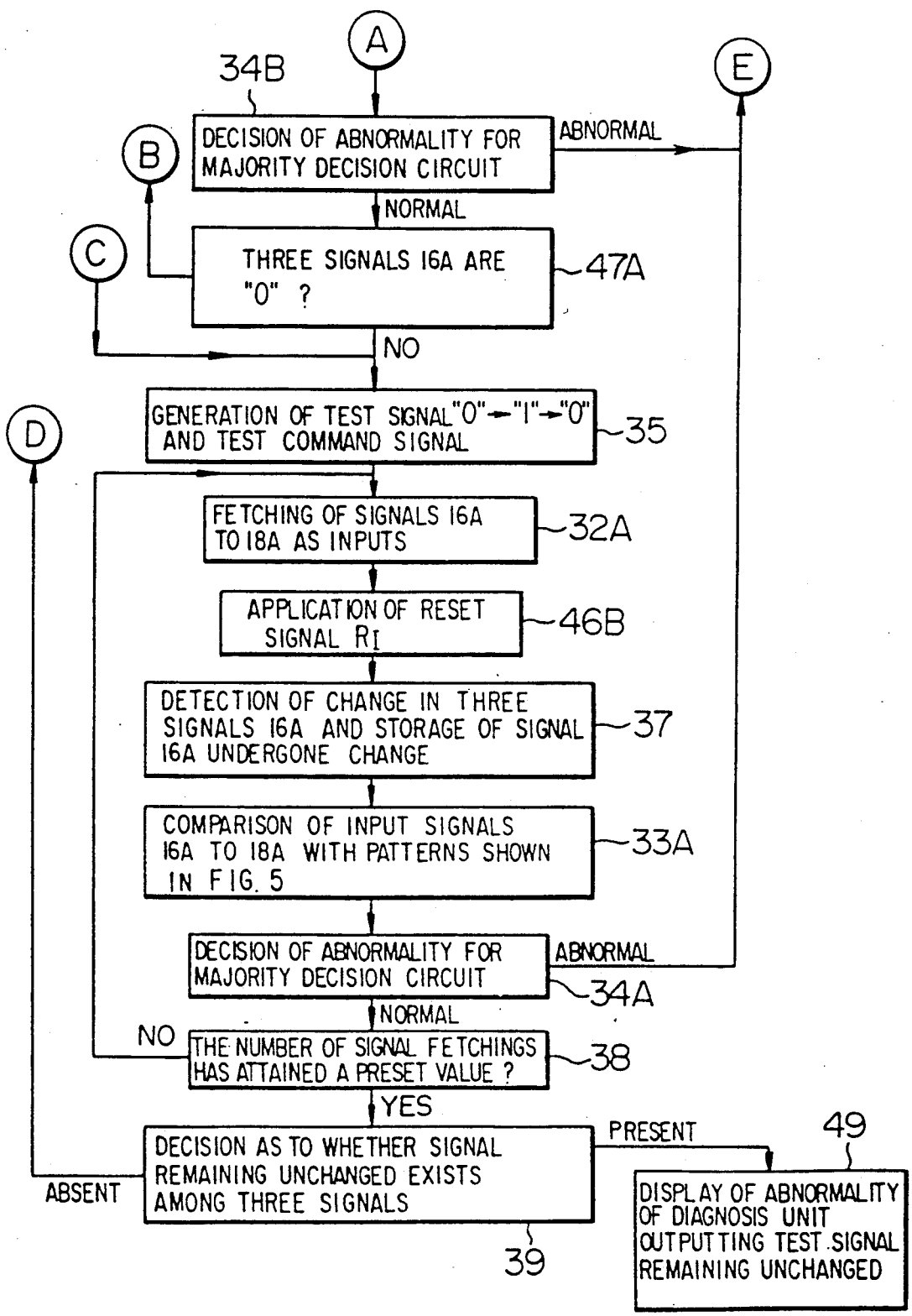

The processing for diagnosis as executed by each diagnosis unit will be described by taking as example the operation of the diagnosis unit $2A_1$, being understood that the diagnosis units $2B_1$ and $2C_1$ execute the processing in the same manner as the diagnosis unit $2A_1$. The CPU 25 constituting a main part of the diagnosis unit $2A_1$ executes the processing in accordance with the processing procedures illustrated in FIGS. 12 and 13 and stored in the ROM 24. In this connection, it should be mentioned that by reading the signals 16A to 18A shown in FIG. 12 and 13 as the signals 16B to 18B, the processing procedure shown in these figures also becomes pertinent to the diagnosis unit $2B_1$. Simiarly, by reading the signals 16A to 18A as the signals 16B to 18B, the processing procedure shown in FIGS. 12 and 13 is pertinent to the diagnosis unit $2C_1$.

The CPU 25 executes a step 31 at first, as the result of which the test signal S of logic "0" is issued onto the wiring conductor 19A through the change-over switch SWA. This test signal S of logic "0" is transmitted to the majority decision circuits 10A to 10C by way of the wiring conductor 19A. The signals b and c (each containing the test signal or the control signal outputted from the associated control apparatus) are outputted through the change-over switches SWB and SWC to be supplied to the majority decision units 10A, 10B and 10C, respectively.

The detection signals 16A, 17A and 18A are inputted to the associated latch circuits 42A to 42F and 42H and the AND gate 43 incorporated in the latch device 41A. When a change or transition takes place in the signals inputted to the latch circuits 42A, 42D, 42F, 42G and 42H in response to the appearance of the test signal S of logic "0" on the wiring conductor 19A, the associated latch circuits mentioned above store therein the updated (new) state of the signals undergone the change or transition. The updated signals stored in the respective latch circuits are then supplied to the input circuit 28 of the diagnosis unit $2A_1$. On the other hand, the other latch circuits 42B, 42C and 42E supply to the input circuit 28 the stored signals as they are, so long as the signal transmitted through the wiring conductors 19B or 19C undergoes no change.

At the step 32, the signals 16A, 17A and 18A are inputted to the CPU 25 to be stored in the RAM 26 through the data bus 30. Subsequently, the CPU 25 confirms (detects) that the signals 16A to 18A have been inputted and then outputs the reset signal $R_I$ (step 46). The reset signal $R_I$ is transmitted to the latch circuits 42A to 42H of the latch device 41A through the wiring conductor 44A to clear the signals stored in the latch circuits 42A to 42H to be logically "0".

Similarly to the case of the embodiment shown in FIG. 1, the input signals 16A to 18A are compared with the output patterns (FIG. 5) outputted by the majority decision circuit 10A in the normal state thereof at the step 33, being followed by a step 34 where the presence or absence of abnormality in the individual components constituting the majority decision circuit 10A is decided. In case the decision at the step 34 results in the presence of abnormality, information of the abnormality (e.g. component suffering from failure) are supplied to the display unit 23 (step 36).

The diagnosis unit 2A₁ receives at the input thereof the outputs from the latch circuits 42D, 42E and 42F and the output of the latch circuit 42G as the signal 17. The reason why the latch circuit 42G for storing the output of the AND gate 43 is provided can be explained as follows. The majority decision circuit 10A realized logically in the 2-out-of-3 voting configuration can output the signal of logic "1" only when the outputs of all the OR gates 5A to 5C assume the level of logic "1". Accordingly, the majority decision circuit 10A can never output the signal of logic "1" at the time points $t_1$, $t_2$ and $t_4$ shown in FIG. 6. It should however be noted that all of the latch circuits 42D to 42F store therein the signals of logic "1" at the time point $t_4$. This can be explained by the fact that the change-over switches SWA, SWB and SWC output the respective test signals S which are deviated temporally from one another due to the processing executed by the individual diagnosis units within an extremely short period $T_4$ at the step 31, as is illustrated in FIG. 6. The latch circuits 42d to 42f output the signal of logic "1" at least at the time point $t_4$. On the other hand, the latch circuit 42H stores the signal of logic "0" at the time point $t_4$. This is because the AND gate 6A of the majority decision circuit 10A issues the signal of logic "0" during the period $T_4$. As a consequence, the diagnosis unit 2A₁ which receives as the inputs thereto only the outputs of the latch circuits 42A to 42F and 42H at the time point $t_4$ will erroneously decide that the AND gate 6A operating normally suffers from abnormality. In order to exclude such erroneous decision, the AND gate 43 and the latch circuit 42G are provided in the latch device 41. The AND gate 43 outputs the logic "1" only when the outputs of the OR gates 5A, 5B and 5C are simultaneously logic "1". Consequently, the latch circuit 42G outputs the signal of logic "1" to the diagnosis unit 2A₁ when the OR gates 5A, 5B and 5C output simultaneously the signal of logic "1". When all of the latch circuits 42D, 42E and 42F output the signal of logic "1", the diagnosis unit 2A₁ makes decision that abnormality is present in the majority decision circuit 10A, provided that the output of the latch circuit 42G is logic "1", while deciding the absence of abnormality when the output of the latch circuit 42G is logic "0".

When it is decided at the step 34 that the majority decision circuit 10A is operating normally, the procedure proceeds to a processing step 47. At this step 47, decision is made as to whether all the output signals of the latch circuits 42A, 42B and 42C (i.e. the signals 16A at the step 37) are logic "0". When the decision at the step 47 results in "NO" (negative), the procedure proceeds to the processing at a step 35. Subsequently, the processings at the steps 32A, 46B, 37, 33A, 34A, 38 and 39 are executed sequentially. The processing at the step 46B is same as that of the step 46. When it is decided at the step 39 that there exists the signal 16A undergone no change, the procedure proceeds to the step 40. Otherwise, the procedure proceeds to the step 31.

In case all the three signals 16A are decided to be logic "0" at a step 47, the CPU 25 outputs a load signal $L_o$ (step 48). This load signal $L_o$ is supplied to the individual latch circuits of the latch device 41A by way of the wiring conductor 45A. All of the latch circuits constituting the latch device 41A fetch to store therein the associated detection signals 16A, 17A and 18A in response to the load signal $L_o$ as inputted. The latch circuit 42G fetches the output of the AND gate 43. Subsequently, the step 32 is executed. The reason why the signals are forcibly fetched by the latch circuits in response to the load signal $L_o$ can be explained as follows. In order to decide whether the individual logical components of the majority decision circuit 41A operate normally or not even in the case where all of the three signals a, b and c are logic "0", the diagnosis unit 2A₁ fetches the outputs of the latch circuits 42A to 42H in response to the load signal $L_o$. In other words, since the latch circuits 42A to 42H are cleared to the state of logic "0" by the reset signal $R_I$, the states stored in the latch circuits undergo no change so long as the detection signals 16A remain logic "0". Accordingly, there arises such possibility that the state where the outputs of all the latch circuits of the latch device 41A are logic "0" might be under the influence of the reset signal $R_I$ rather than the detection signals 16A of logic "0". Under the circumstances, through the forcive signal fetching by the latch circuits 42A to 42H in response to the load signal $L_o$, decision as to the presence or absence of abnormality in the majority decision circuit 10A on the basis of the output of the individual latch circuits cleared in response to the reset signal can be avoided, while allowing the decision of the majority decision circuit 10A to be executed only when all of the three signals 16A are logic "0".

After execution of the step 32B, the steps 46A, 33B and 34B are executed, wherein the same processings as those at the steps 46, 33 and 34 are performed. The processing at the step 47A is performed in the same manner as the step 47. When the result of the step 47A as executed is "YES", the processing starting from the step 48, inclusive thereof, is repeated. On the other hand, when the result of the decision made at the step 47A is "NO", the procedure succeeding to the step 32A, inclusive thereof, is executed.

With the instant embodiment of the invention, similar advantageous effects to those of the embodiment shown in FIG. 1 can be obtained. Besides, by virtue of the provision of the latch device capable of latching the outputs of the individual signal detectors, the test signals S outputted asynchronously by the diagnosis units operating asynchronously can be fetched simultaneously. In other words, notwithstanding that the individual diagnosis units operate asynchronously, the abnormality decision of the given one of the majority decision circuits can be accomplished with high reliability on the basis of the test signals generated simultaneously through cooperation of the other diagnosis units.

When a predetermined time required for the influence of the clearing by the reset signal $R_I$ to become null (i.e. the time required for the signal of logic "0" or logic "1" to be inputted to the latch circuit after the clearing) has elapsed in succession to the processing at the step 46, the step 35 may then be executed. In this case, a series of processings at the steps 47 to 47A described above are rendered unnecessary, whereby the processing procedure can be correspondingly simplified.

The signal detector 11A and the latch circuit 42H may be spared by replacing the AND gate 6A by the wired logic AND gate as in the case of the embodiment shown in FIG. 1.

Figure 14:
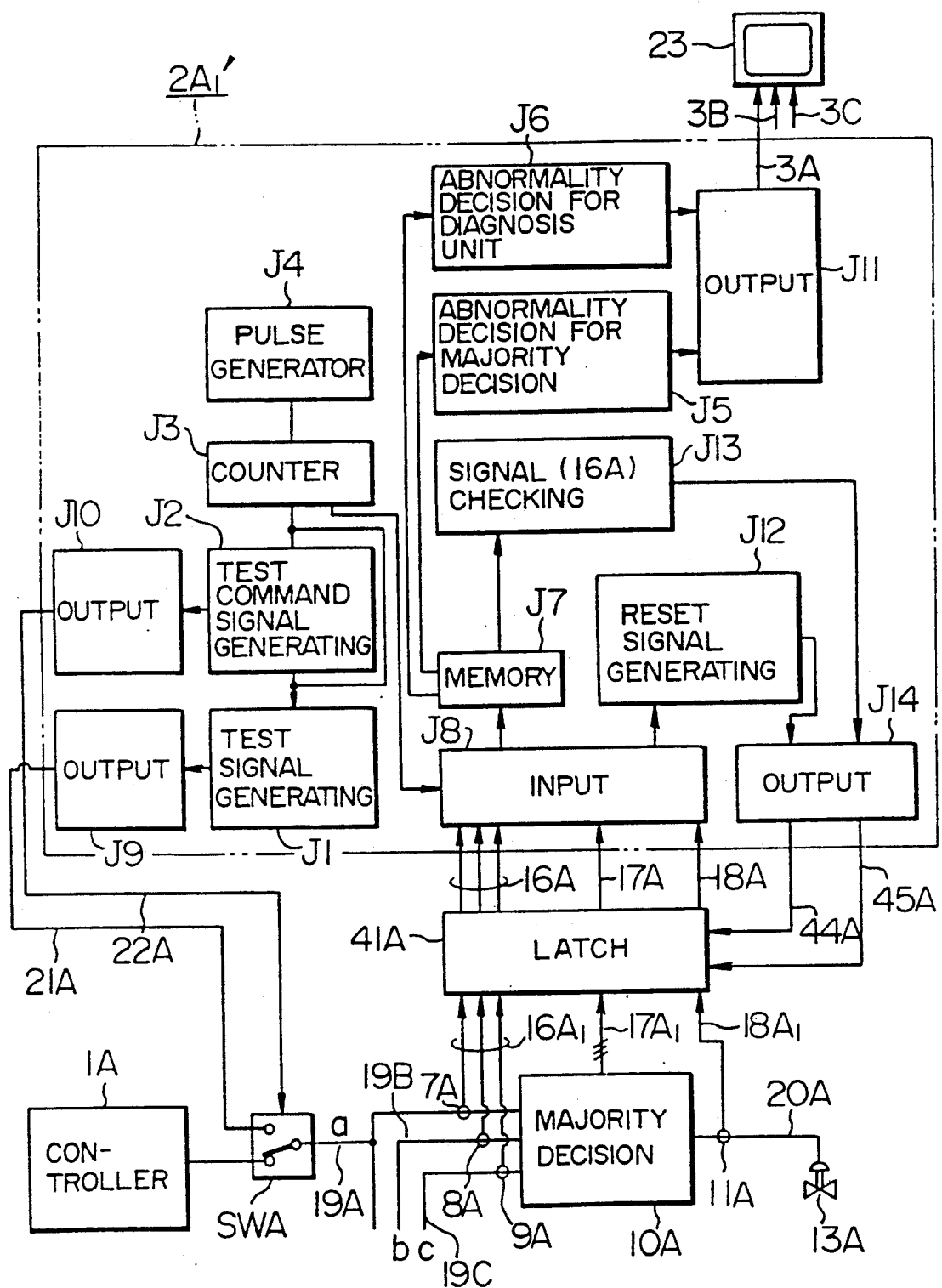
FIG. 14 is a view illustrating functional arrangement of the diagnosis unit employed in the system shown in FIG. 11.

FIG. 14 illustrates the function of the diagnosis unit 2A₁ of the embodiment shown in FIG. 9. The diagnosis unit 2A₁ representing functionally the diagnosis unit 2A₁ differs from the diagnosis unit 2A' illustrated in FIG. 8 in that the reset signal output means J12, the signal (16A) identifying means J13 for outputting the load signal $L_o$ and the output means J14 are added to the diagnosis unit 2A' illustrated in FIG. 8. The diagnosis unit $2B_1$ and $2C_1$ are equivalent to the diagnosis unit $2A_1$' with regard to the function.

Figure 15:
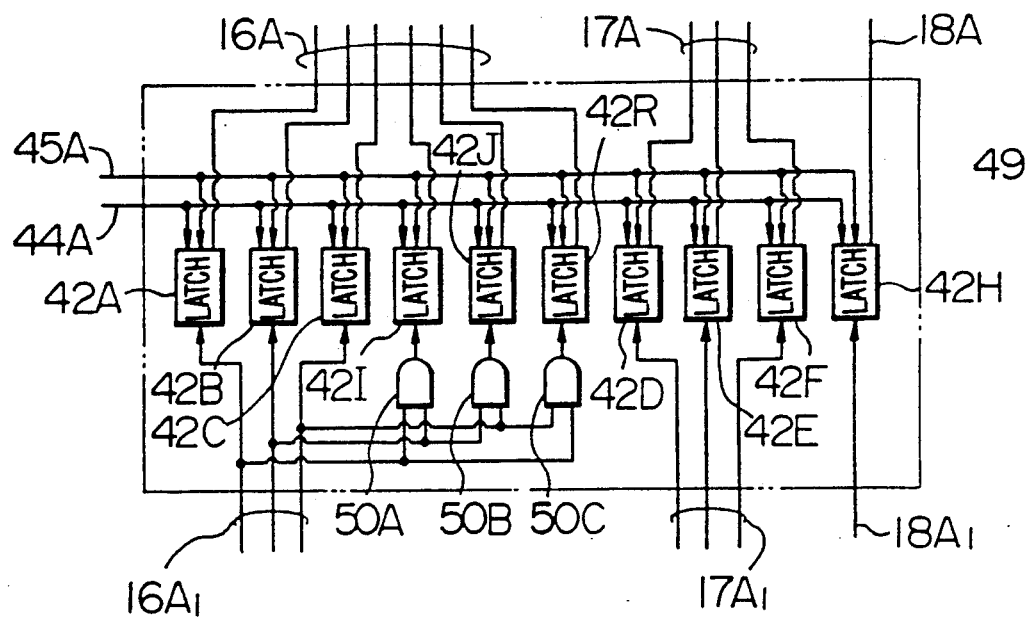
FIG. 15 is a schematic circuit diagram showing a structure of the latch device according to another embodiment.

When each of the majority decision circuits 10A, 10B and 10C of the embodiment shown in FIG. 9 is replaced by the majority decision circuit $10A_1$ shown in FIG. 7, it is then required to construct each of the latch devices 41A, 41B and 41C in the structure of the latch device 49 shown in FIG. 15. This latch device 49 includes latch circuits 42I to 42K and AND gates 40A, 50B and 50C in place of the latch circuit 42G and the AND gate 43 in the latch device 41A. Operation or function of the latch device will be elucidated, assuming, by way of example, that the latch device 49 is employed for the latch device 41A. The AND gate 50A receives as the inputs thereto the output signals of the signal detectors 7A and 8A. The AND gate 50B receives the output signals of the signal detectors 8A and 9A. The AND gate 50C receives the output signals of the signal detectors 7A and 9A. The output of the AND gate 50A is inputted to the latch circuit 42I. The output of the AND gate 50B is inputted to the latch circuit 42J. The output of the AND gate 50C is inputted to the latch circuit 42K. On the other hand, the outputs of the latch circuits 42I to 42K are inputted to the diagnosis unit $2A_1$. Further, the latch circuits 42I to 42K are supplied as other inputs thereto with the reset signal $R_I$ and the load signal $L_o$ through the wiring conductors 44A and 45A. The latch circuits 42D, 42E, 42F are supplied as inputs thereto with the output signals of the signal detectors 12A, 12B and 12C shown in FIG. 7, respectively. At the time point $t_4$ shown in FIG. 4, the signal a is logic "1" while the signals b and c are logic "0". However, all of the latch circuits 42A, 42B and 42C store therein logic "1" at that time point $t_4$. The latch circuits 42A to 42C output the respective signals of logic "1" to the diagnosis unit $2A_1$ at the time point $T_4$. Consequently, the diagnosis unit $2A_1$ will decide that the AND gates 6B to 6C of the majority decision circuit $10A_1$ suffer from abnormality. With a view to preventing such erroneous decision, there are provided the latch circuits 42I, 42H and 42K as well as the AND gates 50A, 50B and 50C similarly to the aforementioned latch circuit 42G and the AND gate 43. The diagnosis unit $2A_1$ performs the abnormality decision for the majority decision circuit $10A_1$ on the presumption that the logic "0" outputs of the latch circuits 42A and 42B are true when the output of the latch circuit 42I is logic "1", the logic "1" outputs from the latch circuits 42B and 42C are true when the output of the latch circuit 42J is logic "1" and that the logic "1" outputs of the latch circuits 42A and 42C are true when the output of the latch circuit K is logic "1".

Figure 16:
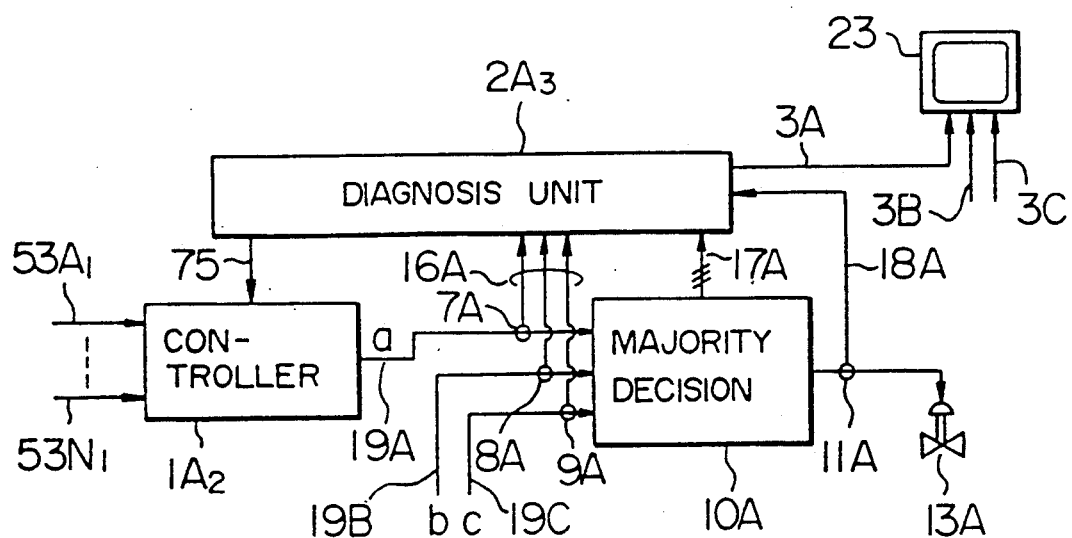
FIG. 16 is a schematic diagram showing a general arrangement of a triplex control system according to still another embodiment of the present invention.

Another embodiment of the triplex control system according to the present invention will now be described by referring to FIGS. 16, 17 and 18. FIG. 16 shows a control apparatus $1A_2$ producing the signal a as the output thereof in association with a majority decision circuit 10A and a diagnosis unit $2A_3$. It will however be readily appreciated that the control apparatuses outputting the signals b and c are also provided in association with the corresponding majority decision circuits and diagnosis units, respectively, in the same manner as shown in FIG. 16. In the case of the instant embodiment, the output signals $S_1$ to $S_n$ of the individual sensors are directly inputted to the control apparatus $1A_2$.

Figure 17:
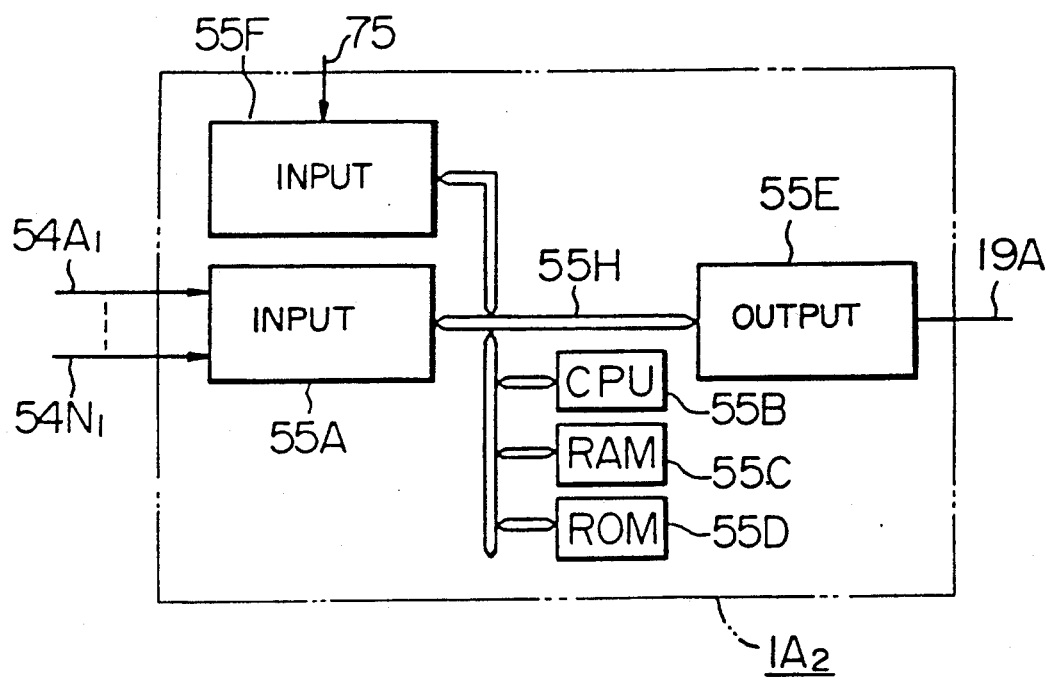
FIG. 17 is a circuit diagram showing a structure of a control apparatus employed in the system shown in FIG. 16.
Figure 18:
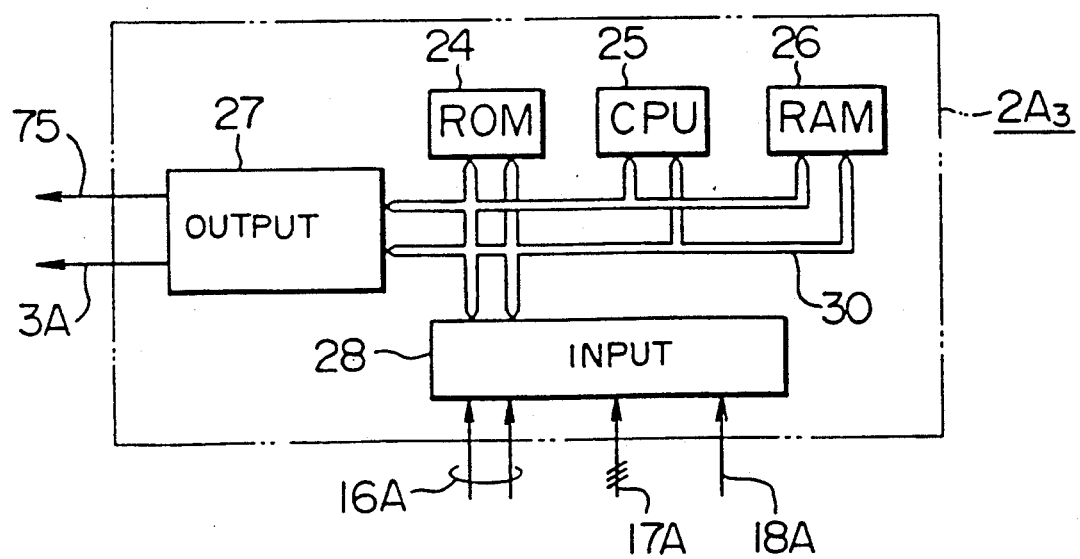
FIG. 18 is a circuit diagram showing a structure of the diagnosis unit employed in the system shown in FIG. 16.

FIG. 17 shows a hardware structure of the control apparatus $1A_2$. As will be seen in this figure, the control apparatus $1A_2$ includes a CPU 55B, a RAM 55C, a ROM 55D, input circuits 55A and 55F, output circuits 55E and 55G and a bus 55H for interconnecting these components. The control apparatuses $1B_2$ and $1C_2$ are also implemented in the same structure. The diagnosis unit $2A_3$ shown in FIG. 18 is substantially identical with the diagnosis unit 2A described hereinbefore in conjunction with FIG. 3. The diagnosis unit $2A_3$ differs from the latter 2A in that external wiring conductors 3A and 75 are connected to the output circuit 27 in the case of the diagnosis unit $2A_3$.

Figure 19:
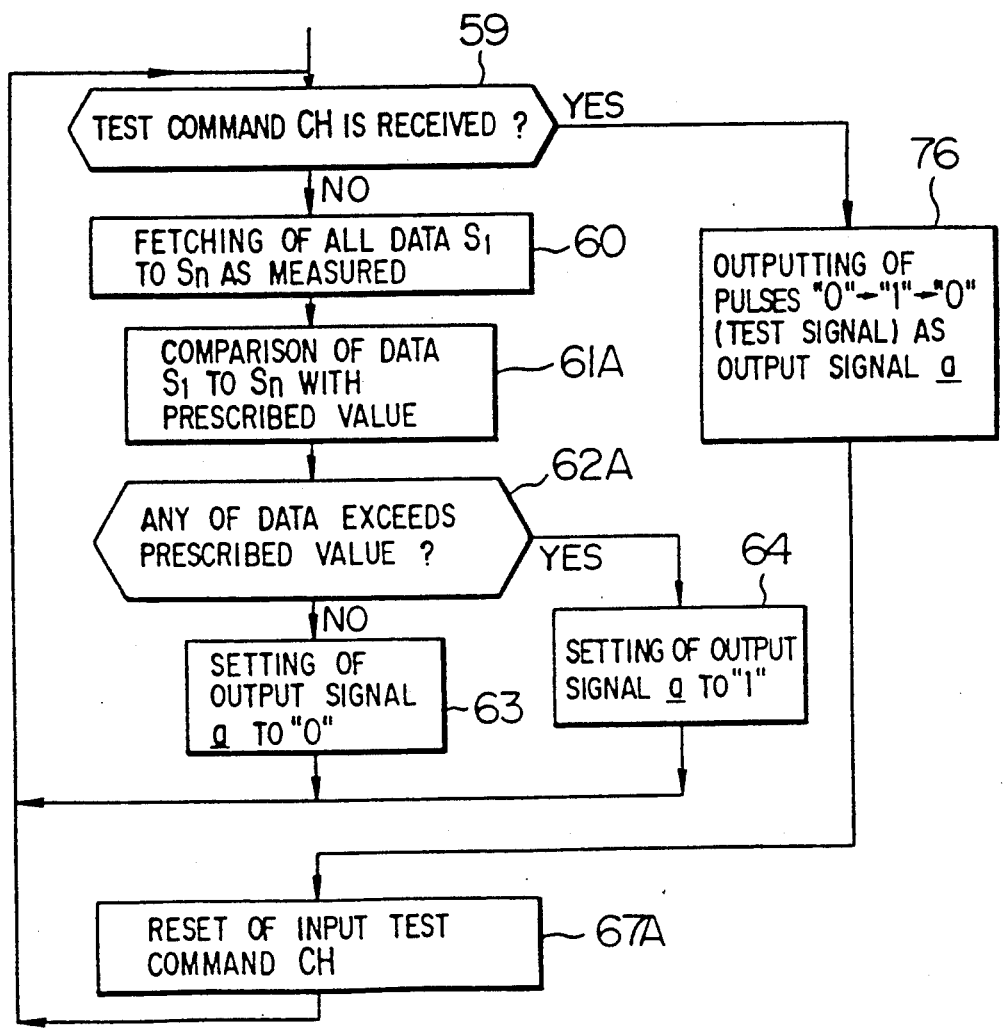
FIG. 19 is a flow chart illustrating a processing procedure executed by the control apparatus shown in FIG. 17.
Figure 20:
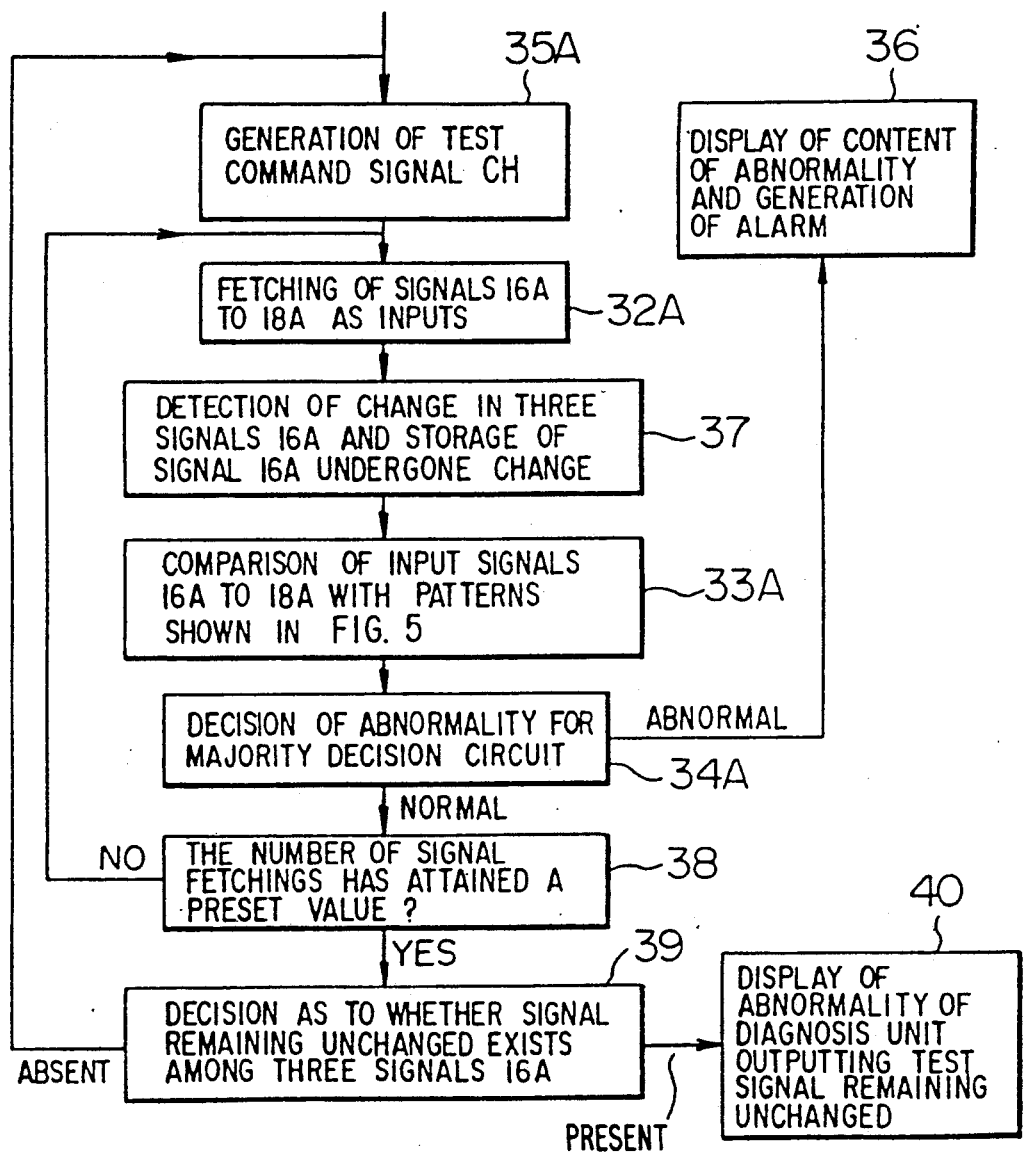
FIG. 20 is a flow chart illustrating a processing procedure executed by the diagnosis unit shown in FIG. 18.

The CPU 25 of the diagnosis unit $2A_3$ executes the processing in accordance with the procedure illustrated in FIG. 20, while the CPU 55B of the control apparatus $1A_2$ executes the processing procedure illustrated in FIG. 19. The processing procedure of FIG. 20 is also executed by the other diagnosis unit as well. Similarly, the processing procedure shown in FIG. 19 is also executed by the other control apparatuses.

The CPU 25 of the diagnosis unit $2A_3$ outputs a test command signal CH at a step 35A. This test command signal CH is inputted to the RAM 55C of the control apparatus $1A_2$ by way of the wiring conductor 75.

The CPU 55B of the control apparatus $1A_2$ executes the processing of a step 59. More specifically, the CPU 55B decides whether the test command signal CH has been inputted or not. Upon inputting of the test command signal CH, decision at the step 59 results in "YES" (affirmative), being followed by the execution of a step 76. In other words, the pulse-like test signal including as alternate sequence of "0", "1" and "0" is outputted as the signal a. The time width or duration of the pulse-like test signal is represented by $T_o$ as in the case of the embodiment shown in FIG. 1. In succession to the outputting of this test signal, the test command signal CH stored in the RAM 55C is erased (step 67) for the purpose of preventing the pulse-like test signal from being frequently outputted under the command of the test command signal CH stored in the RAM 55C. When the sensor output signals $S_1$ to $S_n$ are inputted to the control apparatus $1A_2$, the CPU 55B executes the processing steps 60, 61A, 62A, 63 and 64.

After execution of the step 35A, the CPU 25 of the diagnosis unit $2A_3$ executes the processing steps 32A, 37, 33A, 34A, 38 and 39 described hereinbefore. Additionally, the aforementioned step 36 or 40 may be executed, as occasion requires.

According to the instant embodiment of the invention, there can be obtained the effects similar to those of the embodiment shown in FIG. 1. In particular, it must be pointed out that the probability of influence of failure at least in one of the CPU 55B of the control apparatus $1A_2$ (i.e. function of the test signal generating means K2 shown in FIG. 21), the CPU 25 of the diagnosis unit $2A_3$, the bus 30 and the output circuit 27 (i.e. functions of the test command signal output means J2, the counter J3 and the output means J10) to the device to the controlled is decreased. The diagnosis abnormality decision circuit J4 decides the abnormality in the test signal generating circuit K2, the test command signal outputting circuit J2, the counter J3 and the output circuit J10 on the basis of whether the test signal undergoes or not a change within a predetermined time duration.

Figure 21:
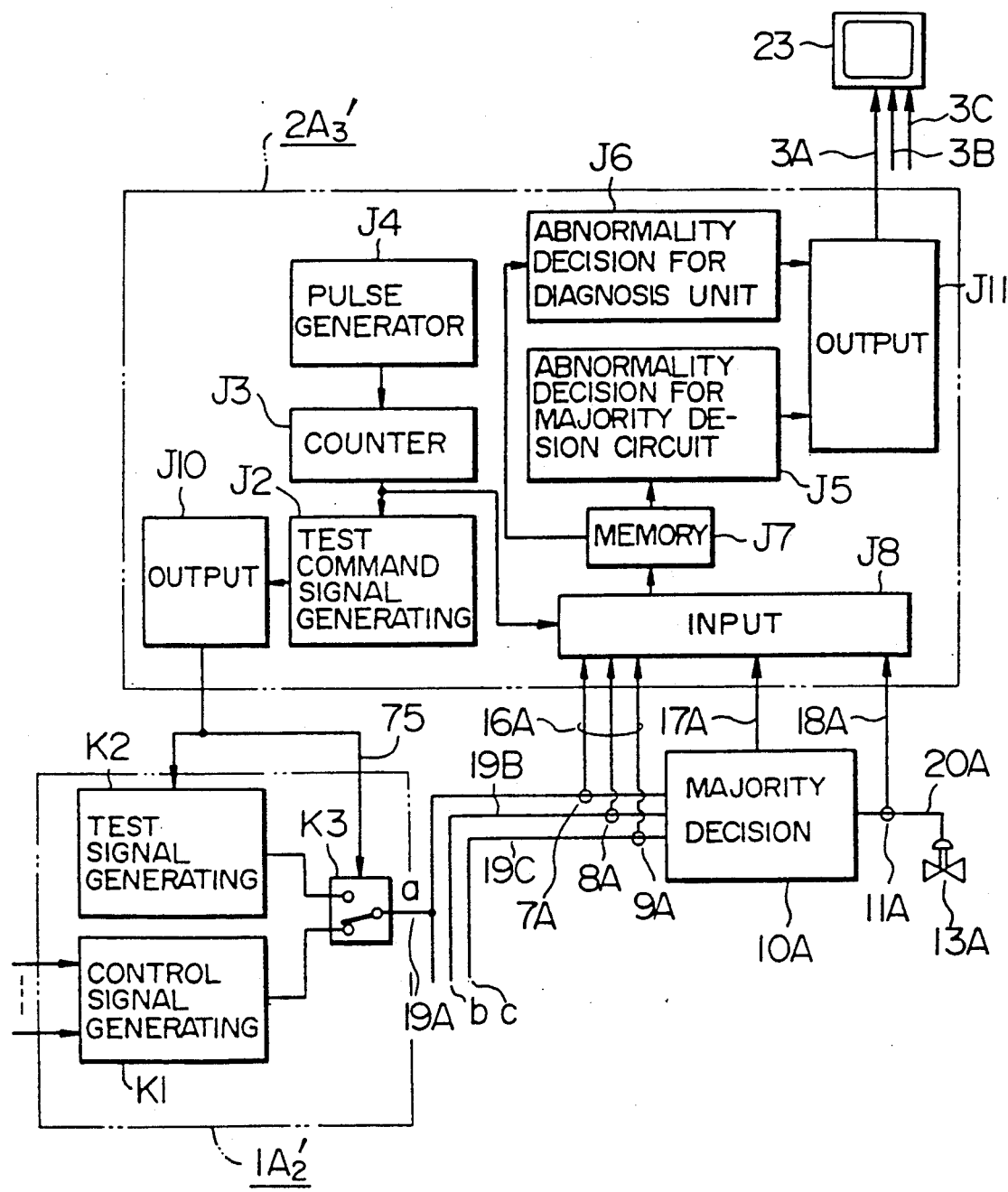
FIG. 21 is a view showing a functional arrangement of the diagnosis unit shown in FIG. 18.

FIG. 21 shows a control apparatus $1A_2$' and a diagnosis unit $2A_3$' which represent functionally the control apparatus $1A_2$ and the diagnosis unit $2A_3$, respectively.

The other control apparatuses and diagnosis units perform respective functions in the similar manner. The diagnosis unit $2A_3'$ differs from the diagnosis unit $2A'$ shown in FIG. 8 in that the test signal generating means J1 and the output means J9 of the latter are omitted and that the controller abnormality decision means J15 is provided as in the case of the diagnosis unit $2A_1$. The control means $1A_2'$ includes a control signal generating means K1 (corresponding to steps 60, 61A, 62A, 63 and 64), a test signal generating means K2 (corresponding to a step 76) and a change-over means K3 (corresponding to a step 59). The test signal generating means K2 receives as the input thereto the test command signal CH and outputs the test signal. The change-over means K3 performs the switching operation in response to the test command signal CH. The control apparatus or controller in each of the embodiments described hereinbefore includes the control signal generating means K1. However, the test signal generating means K2 and the change-over means K3 are not incorporated.

Figure 22:
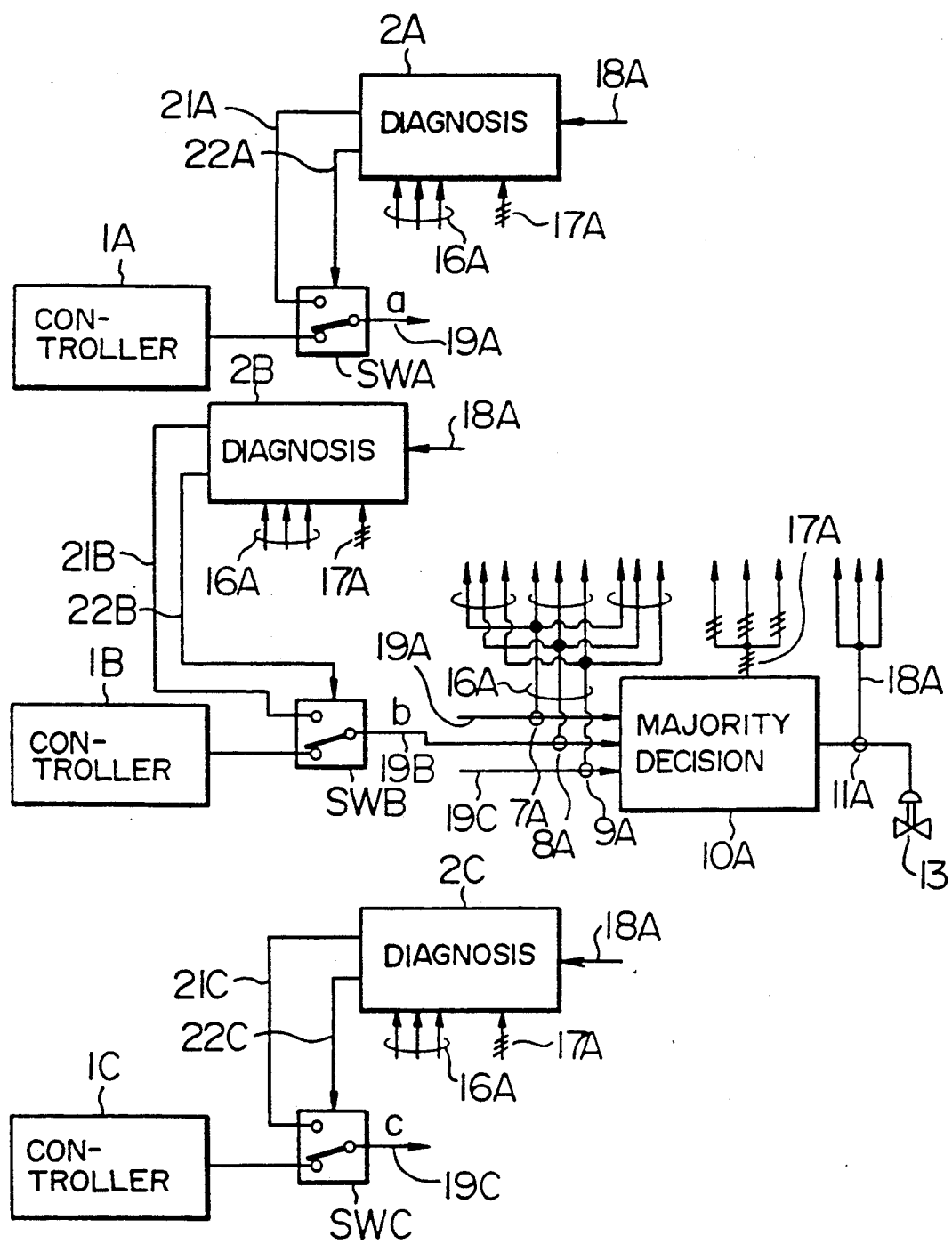
FIG. 22 is a schematic diagram showing a general arrangement of a triplex control system according to a further embodiment of the present invention.

FIG. 22 shows still another embodiment of the triplex control system according to the invention. The triplex control system of the instant embodiment corresponds to the system shown in FIG. 1 in which only one 10A of the three majority decision circuits 10A, 10B and 10C is employed. The device subject to the control is only one valve 13. The control apparatuses (controllers) 1A, 1B and 1C are provided in one-to-one correspondence with the diagnosis units 2A, 2B and 2C, respectively. The detection signals 16A of the signal detectors 7A, 8A and 9A provided on the input side of the majority decision circuit 10A, the detection signals 17 of the signal detectors 12A, 12B and 12C incorporated in the majority decision circuit 10A and the detection signal 18A of the signal detector 11A provided on the output side of the majority decision circuit 10A are branched and inputted to the diagnosis units 2A, 2B and 2C, respectively.

Each of the diagnosis units 2A to 2C executes the same processing as shown in FIG. 4. The instant embodiment can equally provide the advantageous effects as in the case of the embodiment shown in FIG. 1.

In this manner, the teachings of the present invention can be equally applied to the case where only one device is subject to the control.

Parenthetically, it should be mentioned that in the embodiment shown in FIG. 19, the latch devices 41A, 41B and 41C may be provided similarly to the embodiment shown in FIG. 9.

Figure 23:
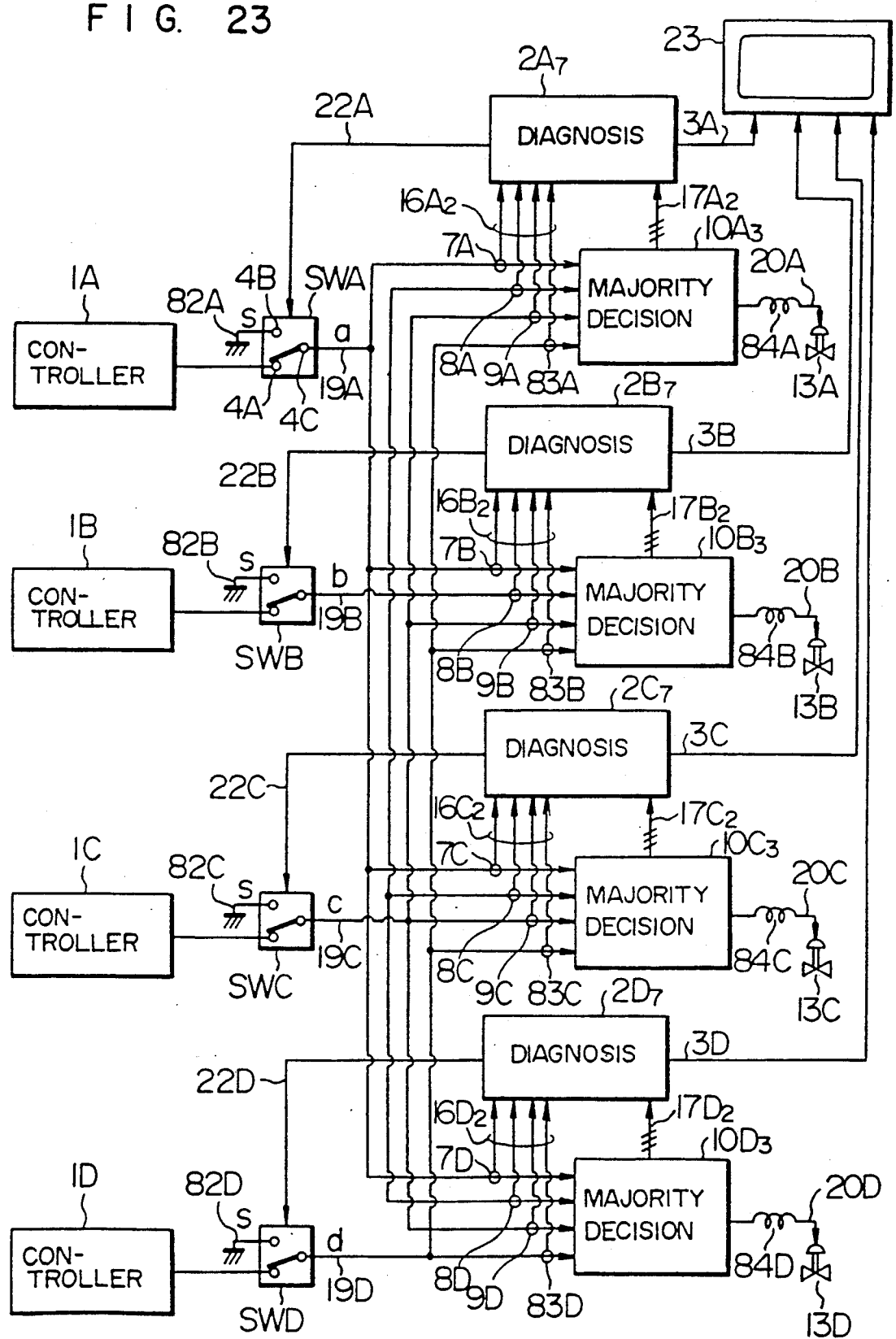
FIG. 23 is a schematic diagram showing a general arrangement of a quadruplex control system according to a still further embodiment of the present invention.
Figure 24:
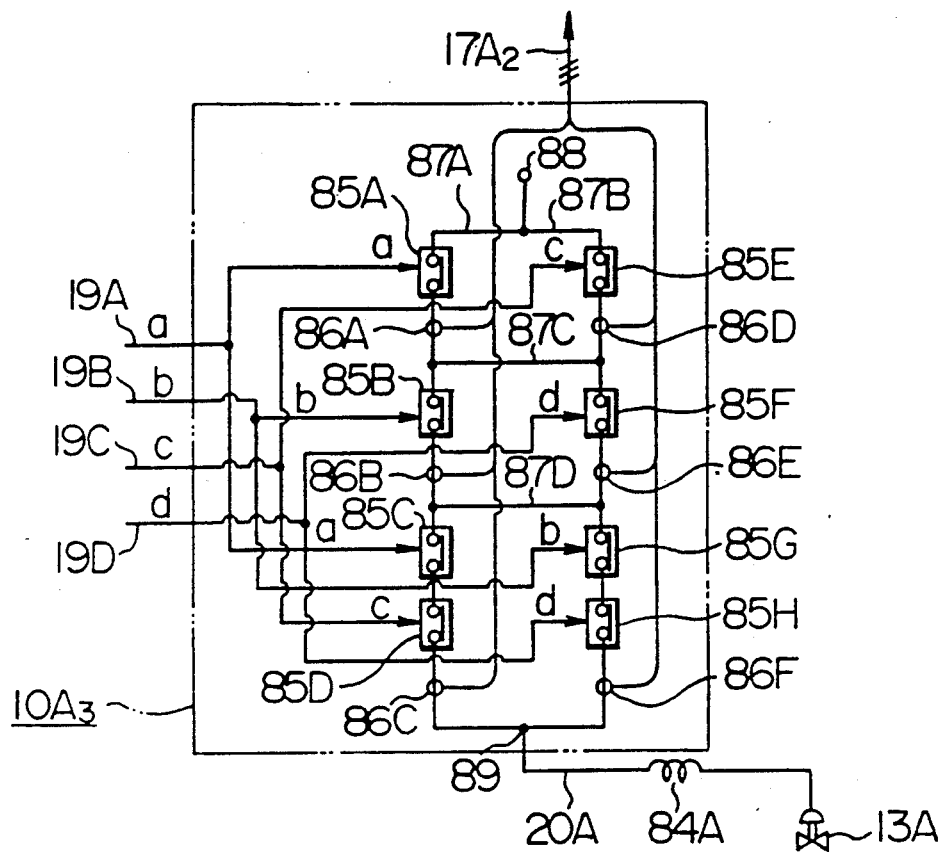
FIG. 24 is a circuit diagram showing a structure of a majority decision circuit employed in the system of FIG. 23.

Next, a quadruplex control system according to a further embodiment of the present invention will be described by reference to FIGS. 23, 24 and 25. The quadruplex control system is applied to a nuclear reactor protection or safeguard system in a nuclear power plant. The arrangement of this control system is essentially identical with that of the system shown in FIG. 1 except that a control apparatus (controller) 10, a change-over switch SWD, a majority decision circuit $10D_3$, a diagnosis unit $2D_7$, signal detectors 7D, 8D, 9D and 83A to 83D and wiring conductors 19D and 22 are additionally provided because of the quadruplexing. Reference characters 84A to 84D designate excitation coils for actuating valves 13A to 13D, respectively. Although the excitation coils 84A to 84D are shown separately from the associated valves 13A to 13D in FIGS. 23 and 24, is will readily be understood that they are assembled together in reality. The control apparatus 10 is of the same structure as the apparatus 1A, 1B or 1C and serves for the same function as the latter. The change-over switch SWD serves for the same function as the switch SWA, SWB or SWC. The wiring conductor connected to the stationary contact 4C of the change-over switch SWD is connected to the majority decision circuits $10A_3$ to $10D_3$, respectively. The signal detectors 83A, 83B, 83C and 83D detect the signal carried by the wiring conductor 19D on the input sides of the associated majority decision circuits, respectively. The signal detectors 7D, 8D and 9D detect the signal transmitted through the corresponding wiring conductors 19A to 19C on the input side of the majority decision circuit $10D_3$ similarly to the signal detectors 7A, 8A and 9A.

Connected to the stationary contacts of the change-over switches SWA to SWD are the wiring conductors 82A to 82D, which are grounded, as is shown in FIG. 23. These wiring conductors 82A to 82D function as the test signal generating means for supplying the test signals S of logic "0" to the associated majority decision circuits, respectively, whenever the associated change-over switches assume the state in which the stationary contacts 4B and 4C are connected to each other.

FIG. 24 shows a structure of the majority decision circuits $10A_3$ to $10D_3$ each implemented in the from of a 2-out-of-4 voting logic configuration. The majority decision circuit $10A_3$ includes relays (or contactors) 85A to 85H constituting the switch means, signal detectors 86A to 86F, an AND gate 89 realized by a wired logic and wiring conductors 87A to 87D. The relays 85A, 85B and 85C and 85D are disposed in series and interconnected by the wiring conductor 87A. The relay 85E, 85F, 85G and 85H are also disposed in series and mutually connected by the wiring conductor 87B. The wiring conductor 87C connects the portion of the wiring conductor 87A located between the relays 85A and 85B and the portion of the wiring conductor 87B located between the relays 85E and 85F to each other. On the other hand, the wiring conductor 87D connects the portion of the wiring conductor 87A located between the relays 85B and 85C to the portion of the wiring conductor 87B located between the relays 85F and 85G. The wiring conductors 87A and 87B are connected together and hence connected to a power supply source 88. The wiring conductor 87A has the other end connected to the other end of the wiring conductor 87B to thereby realize the AND gate 89 in the form of a wired logic. The AND gate 89 in turn is connected to the wiring conductor 20A. In the case of the instant embodiment, the wired logic AND gate 89 is provided in each of the majority decision circuits $10A_3$ to $10D_3$, whereby the necessity for providing the signal detectors 11A to 11C in the wiring conductors 20A to 20D, respectively, as in the case of the embodiment shown in FIG. 1, is avoided.

Now, description will be turned to the disposition of the signal detectors 86A to 86F within the majority decision circuit $10A_3$. The signal detectors 86A to 86F are contactless sensors as with the case of the signal detectors 7A to 9A. The signal detector 86A is provided for the wiring conductor 87A at a location between the junction of the wiring conductors 87C and 87A and the relay 85A. The signal detector 86B is provided for the wiring conductor 87A at a location between the junction of the wiring conductors 87D and 87A and the relay 85B. The signal detector 86C is provided in association with the wiring conductor 87A between the relay 85D and the AND gate 89. The signal detector 86E is provided in association with the wiring conductor 87B at a location between the junction of the wiring conductor 87C and 87B and the relay 85E. The signal detector 86F is provided for the wiring conductor 87B at a location between the junction of the wiring conductors 87D and 87B and the relay 85F. The signal detector 86F is provided for the wiring conductor 87A at a location between the relay 85H and the AND gate 89.

The signal a is applied to the relay 85A and 85C by way of the wiring conductor 19A. The signal b is applied to the relays 85B and 85G through the wiring conductor 19B. The signal c is applied to the relays 85E and 85D through the wiring conductor 19C. The signal d is applied to the relays 85F and 85H through the conductor 19D. Each of the relays 85A to 85H is opened when the associated one of the signals a to d is logic "0" while being closed when the associated signal is logic "1". When two or more of the signals a to d assume the logic "0" level, connection of the excitation coil 84A to the power supply source 88 is broken by the opening of the contact of the associated relay, resulting in that the excitation coil 84A is brought to the deenergized state to open the valve 13A. When three or more of the signals a to d assumes the logic "1" level, interconnection between the excitation coil 84A and the power supply source 88 is established by the associated relay contact being closed, whereby the excitation coil 84A is electrically energized to close the valve 13A.

A 2-out-of-4 logic circuit corresponding to the structure of the majority decision circuit $10A_3$ in which the signal detectors 86A to 86F are omitted is disclosed in a Japanese publication entitled "Handbook of Nuclear Engineering" published by Ohm Sha Ltd. (Nov. 30, 1976), p. 264, Table 9.6. The logic of the 2-out-of-4 logic circuit of this majority decision circuit is given by the following expression:

$$Z = abc + bcd + cda + dab \quad (1)$$

where Z represents the output of the AND gate 86, and a to d represent the values of the corresponding signals a to d.

Each of the majority decision circuits $10A_3$ to $10D_3$ is a sort of signal selecting device for selecting such a signal from a plurality of input signals which is to operate the device subject to the control, to thereby output an actuation signal therefor similarly to the majority decision circuits 10A to 10C shown in FIG. 1. However, the majority decision circuits $10A_3$ to $10D_3$ differ from the majority decision circuits 10A to 10C shown in FIG. 1 in that the signal selected from the four input signals (signals a to d) is not outputted intact as the actuation signal. In other words, in the case of the majority decision circuits according to the instant embodiment of the invention, the relays 85A to 85H select the signal for operating the device (e.g. valve) subject to the control, whereupon the signal differing from the selected input signal a, . . . or d (e.g. current from the power supply source 88) is outputted as the actuation signal for the device under the control.

The detection signals detected by the signal detectors 86A to 86F are supplied to the input circuit 28 (FIG. 25) of the diagnosis unit $2A_7$ through separate wiring conductors. This input circuits 28 is also supplied with the detection signals of the signal detectors 7A to 9A and 83A. In FIGS. 23 and 24, the latter detection signals are collectively designated by $16A_2$ while the former detection signals are collectively designated by $17A_2$. Further, reference characters $16B_2$ to $16D_2$ designate the detection signals outputted from the signal detectors 7B to 9B, 83B, 7C to 9C, 83C, 7D to 9D and 83D. Reference characters $17B_2$ to $17D_2$ designate the detection signals of the signal detectors 89A to 86F in the majority decision circuits $10B_2$ to $10D_2$.

Figure 25:
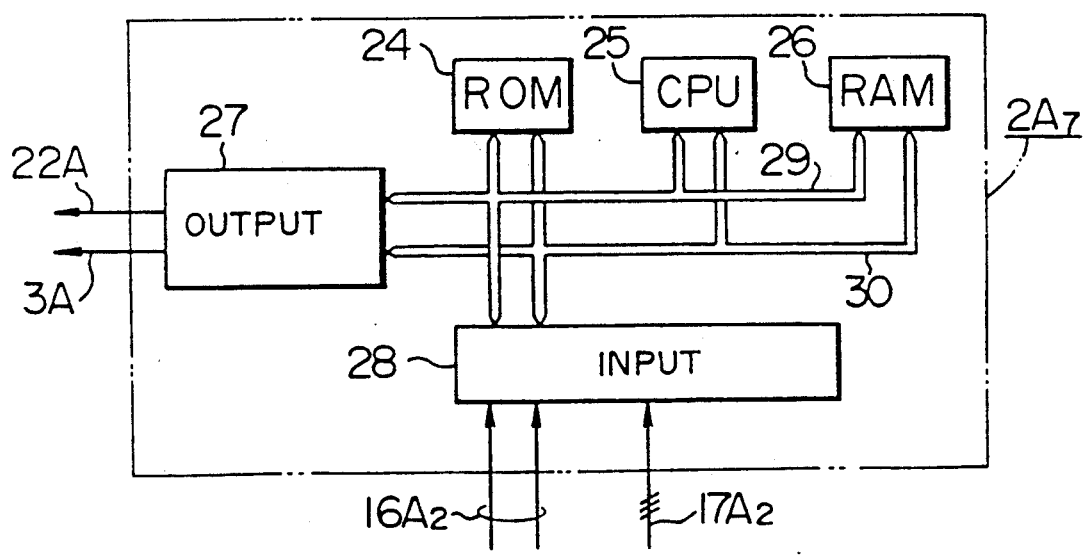
FIG. 25 is a circuit diagram of a diagnosis unit employed in the system of FIG. 23.

Each of the diagnosis units $2A_7$ to $2D_7$ is implemented in a structure shown in FIG. 25 and substantially identical with the diagnosis unit 2A shown in FIG. 3.

Figure 26:
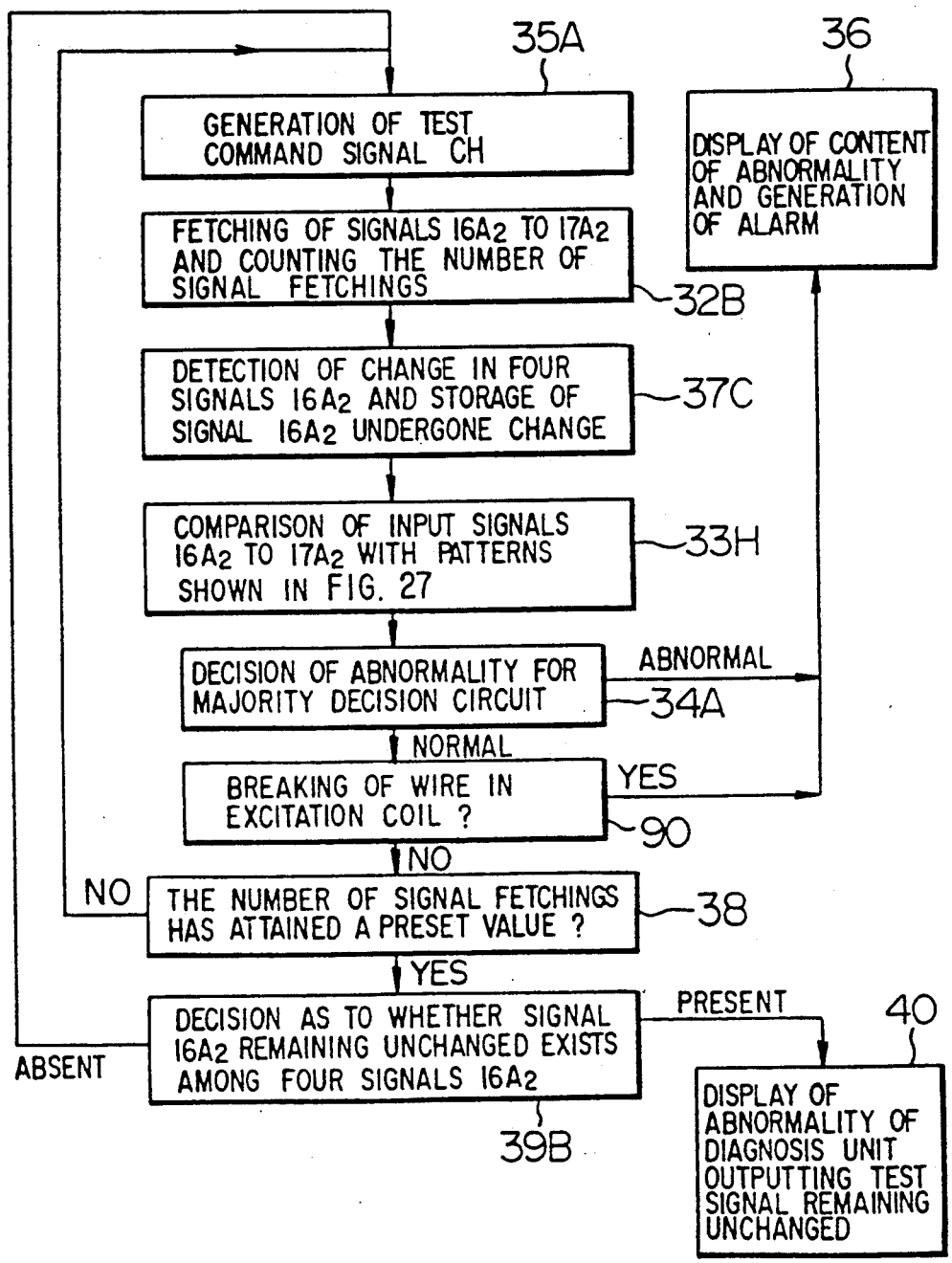
FIG. 26 is a view illustrating a processing procedure executed by the diagnosis unit of the system shown in FIG. 25.
Figures 27, 28:
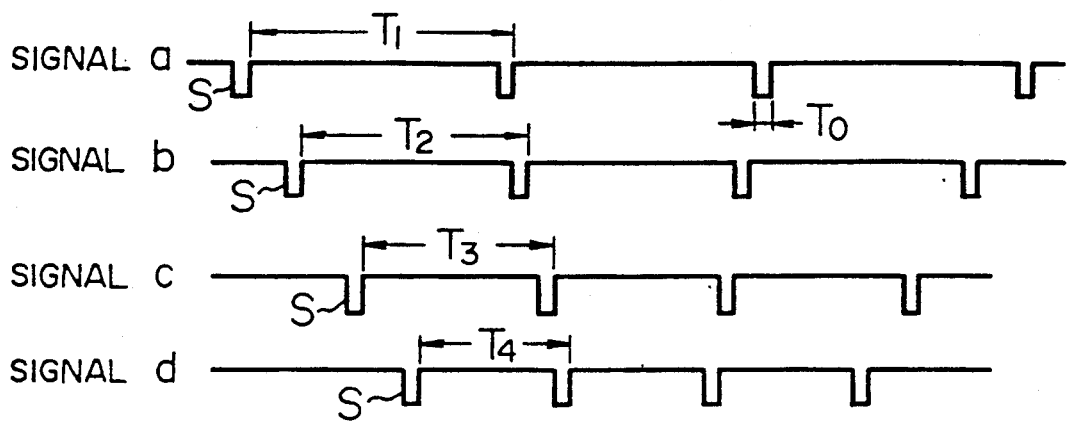
FIG. 27 is a timing chart illustrating waveforms of the test signals outputted by change-over switches employed in the system of FIG. 23.
FIG. 28 is a view showing, listed in a table, those relays which can be monitored by the signal detectors shown in FIG. 24.

The abnormality diagnosing function of the instant embodiment will be described below. The diagnosis units $2A_7$ to $2D_7$ are each designed to perform the same function. Accordingly, in the following, the contents of processing executed by the diagnosis unit $2A_7$ will be elucidated, by way of example. The CPU 25 of the diagnosis unit $2A_7$ reads out the processing procedure illustrated FIG. 26 from the ROM 42. At first, in a step 35A, the test command signal CH is outputted. In response to this test command signal CH, the change-over switch SWA change-overs the state in which the control apparatus 1A is connected to the wiring conductor 19A to the state where the wiring conductors 82A serving as the signal generating means is connected to the conductor 19A. As a consequence, the test signal S of logic "1" is transmitted to the wiring conductor 19A from the conductor 82A. The control apparatus 1A supplied with the sensor signal outputs the signal of logic "1" in the normal state where the valve 13A is held in the closed state. This signal of logic "1" is transferred to the wiring conductor 19A by way of the switch SWA so long as no test command signal CH is outputted. When the valve 13A is to be closed, the control apparatus 1A outputs the signal of logic "0". Since the diagnosis units $2A_7$ to $2D_7$ operate asynchronously with one another, the test signals S outputted from the wiring conductors 82A to 82D to the corresponding wiring conductors 19A to 19D in response to the test command signal CH have such periods $T_1$ to $T_4$ as illustrated in FIG. 27, respectively. These periods $T_1$ to $T_4$ can be adjusted by the previously mentioned counters incorporated in the diagnosis units $2A_7$ to $2D_7$. Upon interrupt of the output of the test command signal CH from the diagnosis unit $2A_7$, the signal of logic "1" outputted from the control apparatus 1A is transmitted to the wiring conductor 19 similarly to the original state. The pulse width $T_o$ during which the signal of logic "0" is outputted is so determined that the valve 13A is prevented from being actuated, as with the case of the duration $T_o$ of the pulse-like test signal illustrated in FIG. 6 for the control system shown in FIG. 1.

After the step 35A, the signals $16A_2$ and $17A_2$ are inputted to the CPU 25, the number of these input signals being counted (step 32B). At a step 37C, change in the four inputted signals $16A_2$ is detected, wherein the signal $16A_2$ undergone the change is stored in the RAM 26. At a step 33H, the input signals $16A_2$ and $17A_2$ are compared with the normal signal patterns shown in FIG. 29. Subsequently, decision is made as to the presence or absence of abnormality in the majority decision circuit $10A_3$. FIG. 28 shows, listing in a table, the relays which can be detected individually by the signal detectors 86A to 86F. The signal detectors 86A to 86F are designed to detect the current. When the relay 85A, for example, is closed, a current flows through the signal detector 86A. On the other hand, when the relay 85A is opened, no current flows through the signal detector 86A. Each signal detector produces the output signal of logic "1" when the current flows through the associated relay, while producing the output signal of logic "0" when no current flows through the associated relay. When the patterns of the input signals 16A$_2$ and 17A$_2$ differ from the normal signal patterns shown in FIG. 29, it is decided that the majority decision circuit 10A$_3$ suffers abnormality or malfunction, whereupon the processing at the step 36 is executed. Discrepancy in the pattern resulting from the pattern comparison indicates that abnormality occurs in the associated relays listed in the rightmost column in the table shown in FIG. 29. Needless to say, the relays are logical elements constituting parts of the majority decision circuit 10A$_3$.

When the decision at the step 34A results in the absence of abnormality, decision is then made at a step 90 whether breaking of wire occurs in the excitation coil 84A. If the outputs of all the signal detectors 86A to 86F are logic "0" in the state where all the outputs of the signal detectors 7A to 9A and 83A are logic "1", it is then decided that breaking of wire takes place in the excitation coil 84A, being then followed by execution of the processing at the step 36. When the decision at the step 90 results in "NO", a step 38 is executed whereupon the processing succeeding to the step 35A is repeated. On the other hand, when the result of decision made at the step 38 is "YES", the procedure proceeds to the processing of the step 39B, where decision is made as to the abnormality of another diagnosis unit in the manner similarly to the step 39 (FIG. 4).

Figure 10:
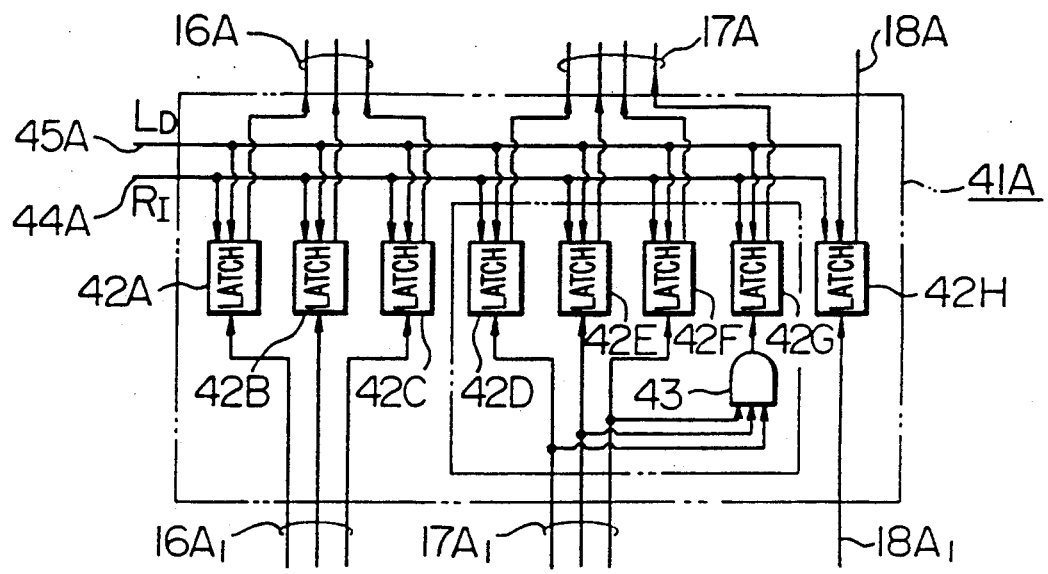
FIG. 10 is a schematic circuit diagram showing a structure of a latch device employed in the system shown in FIG. 9.

In the case of the instant embodiment, the latch devices described hereinbefore in conjunction with FIG. 9 and 10 can be employed.

The quadruplex control system according to the instant embodiment can bring about the similar advantageous effects to those of the system shown in FIG. 1. However, when compared with the system shown in FIG. 1 in which the function of the signal generating means is imparted to the microcomputer constituting the diagnosis unit 2A or the system including the control apparatus connected in the manner shown in FIG. 16, the quadruplex control system requires that the signal generating means be provided separately and independent of the diagnosis unit and the control apparatus, involving a structure complicated more or less as compared with the triplex control system on the whole.

Figure 30:
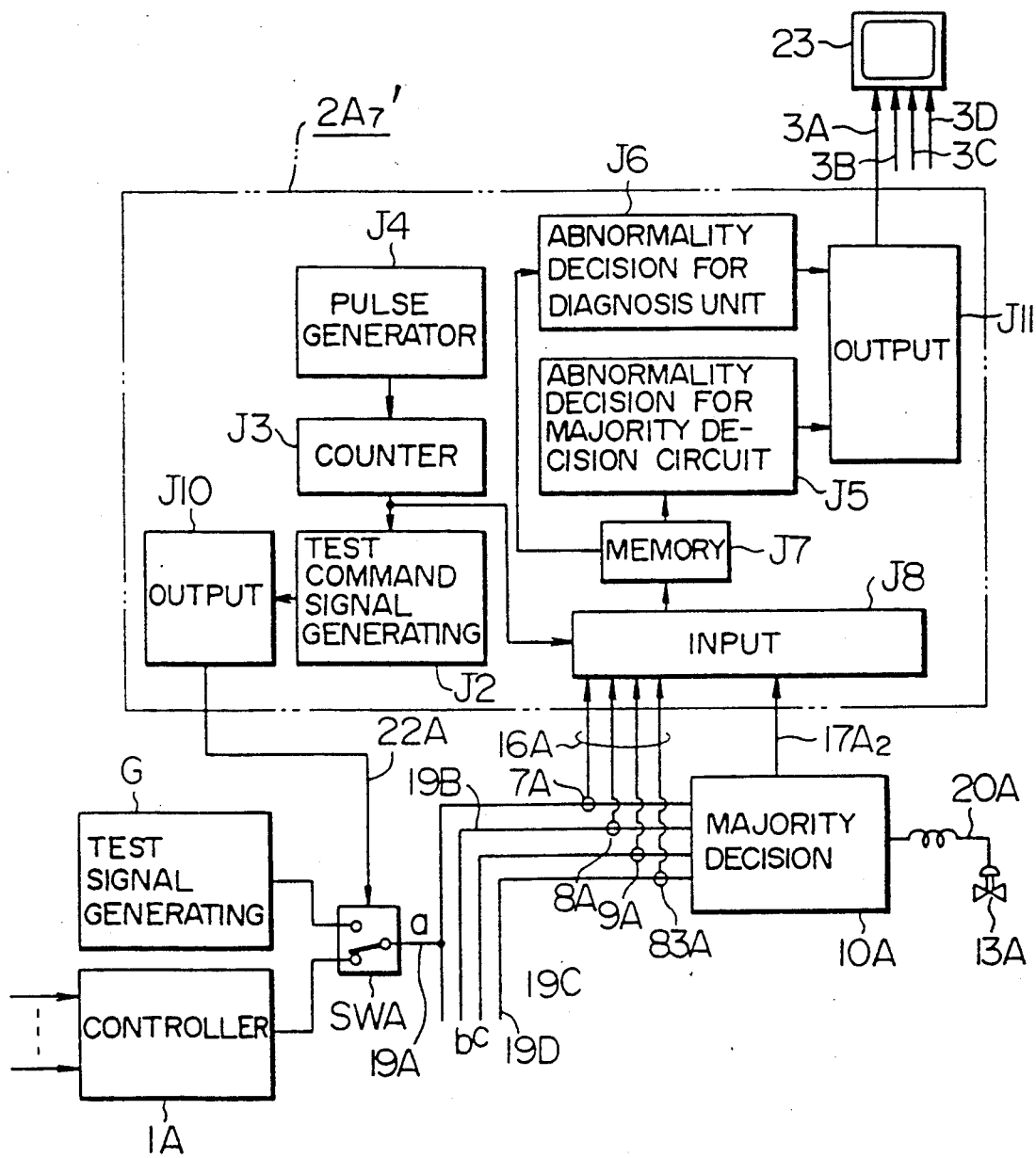
FIG. 30 is a view for illustrating a functional arrangement of the diagnosis unit employed in the system of FIG. 23.

FIG. 30 is a view illustrating functionally the quadruplex control system according to the instant embodiment. By way of example, the diagnosis unit 2A, can be functionally implemented as indicated by a block 2A$_7'$. This diagnosis unit 2A$_7'$ is substantially identical with the diagnosis unit 2A$_3'$ shown in FIG. 21 with regard to the function. The former differs from the latter only in that the test signal generating means (the grounded wiring conductor 82A shown in FIG. 23) G and the change-over switch (change-over) SWA are provided externally of the control apparatus 1A$_2$, wherein the test command outputted from the test command signal output means J2 is inputted to the change-over switch SWA rather than the test signal generating means G. In this connection, it should be appreciated that these functions of the test signal generating means G and the change-over switch SWA of the diagnosis unit 2A$'_7$ can also be applied to the triplex control system described hereinbefore in conjunction with FIG. 1 and others.

Figure 31:
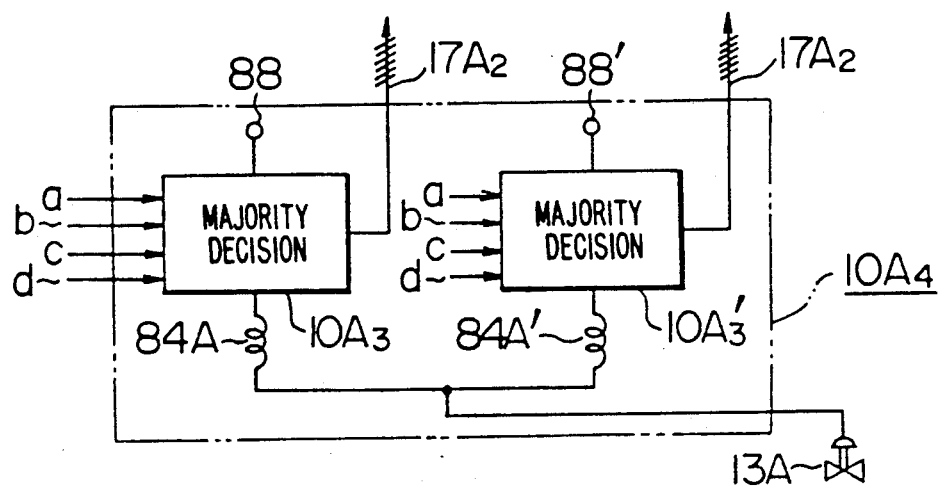
FIG. 31 is a circuit diagram showing another exemplary structure of the majority decision circuit which can be employed in the system shown in FIG. 23.

There is known a dual-solenoid type nuclear reactor protecting system having an enhanced reliability. In this system, a single valve 13A is provided with a pair of excitation coils 84A and 84A' so that the valve 13A is opened only when both the excitation coils are deenergized, as is shown in FIG. 31. The teaching of the present invention can equally be applied to the abnormality decision for a majority decision circuit 10A$_4$ provided in association with the dual-solenoid valve, which circuit 10A$_4$ may then be composed of the majority decision circuit 10A$_3'$ having the same structure as the circuit 10A$_3$.

Further, the teaching of the present invention can be applied to a duplex control system as well. Besides, the invention can also be applied not only to a multiplexed control system designed to output analogue control signals but also to a multiplex control system equipped with an intermediate value selecting circuit employed as the signal selector (corresponding to the majority decision circuits in the various systems described hereinbefore) to which the abovementioned control signal is applied. In this case, however, it is necessary to change the latch circuit (for example, FIG. 10; 41A to 41H) to a sample-hold circuit receiving the input signals to determine any abnormality of the intermediate value selecting circuit by comparing magnitude of the signals.

We claim:

1. A multiplex control system, comprising:
a plurality of test signal generating means provided respectively, for each of control apparatuses installed in parallel with one another, for diagnosis of abnormality;
a plurality of signal selecting means connected to one another for selecting from the signals produced by said plurality of control apparatuses a signal for operating a device under control; and
a plurality of diagnosis units for deciding presence or absence of abnormality in said signal selecting means on the basis of signals inputted to said signal selecting means and respective signals outputted from said plurality of selecting means.

2. A multiplex control system according to claim 1, wherein said signal selecting means is so arranged as to output an actuation signal for operating said device under control, when a predetermined number of signals of those outputted from said plurality of control apparatuses indicate that said device under control is to be operated.

3. A multiplex control system according to claim 1, wherein said diagnosis unit includes said test signal generating means.

4. A multiplex control system according to claim 1, wherein said diagnosis means operate asynchronously with one another.

* * * * *